United States Patent
Tufts, Jr. et al.

(10) Patent No.: US 11,529,931 B2
(45) Date of Patent: Dec. 20, 2022

(54) WINDSHIELD WIPER ARM ADAPTER, COUPLER AND ASSEMBLY

(71) Applicant: TRICO PRODUCTS CORPORATION, Rochester Hills, MI (US)

(72) Inventors: Lindsey Tufts, Jr., Cleveland, OH (US); David Boll, Cleveland, OH (US); Nicholas E. Stanca, Cleveland, OH (US); Robert Soreo, Cleveland, OH (US); R. Kenneth Thorstenson, IV, Rochester Hills, MI (US); James Croston, Rochester Hills, MI (US); Dan Ehde, Rochester Hills, MI (US)

(73) Assignee: TRICO PRODUCTS CORPORATION, Rochester Hills, MI (US)

( * ) Notice: Subject to any disclaimer, the term of this patent is extended or adjusted under 35 U.S.C. 154(b) by 105 days.

(21) Appl. No.: 16/625,630

(22) PCT Filed: Feb. 19, 2019

(86) PCT No.: PCT/US2019/018462
§ 371 (c)(1),
(2) Date: Dec. 20, 2019

(87) PCT Pub. No.: WO2019/161348
PCT Pub. Date: Aug. 22, 2019

(65) Prior Publication Data
US 2020/0156595 A1    May 21, 2020

Related U.S. Application Data

(60) Provisional application No. 62/713,712, filed on Aug. 2, 2018, provisional application No. 62/632,199, filed on Feb. 19, 2018.

(51) Int. Cl.
  *B60S 1/40* (2006.01)
  *B60S 1/38* (2006.01)

(52) U.S. Cl.
  CPC . *B60S 1/40* (2013.01); *B60S 1/38* (2013.01); *B60S 1/3849* (2013.01);
  (Continued)

(58) Field of Classification Search
  CPC .. B60S 1/38; B60S 1/40; B60S 1/4003; B60S 1/4009; B60S 1/4016; B60S 1/4019;
  (Continued)

(56) References Cited

U.S. PATENT DOCUMENTS 3,659,309 A * 5/1972 Besnard .................... B60S 1/40
                                              15/250.32
4,094,038 A    6/1978 Hancu
(Continued)

FOREIGN PATENT DOCUMENTS

BR    112012011686 A2    3/2016
CH        635544 A5      4/1983
(Continued)

OTHER PUBLICATIONS

Reflex Platinum Wiper Blades, Installation Instructions (2 pages).
(Continued)

*Primary Examiner* — Gary K. Graham
(74) *Attorney, Agent, or Firm* — Bryan Cave Leighton Paisner LLP

(57) ABSTRACT

An adapter that connects with a coupler for a wiper element is configured to connect with a plurality of different wiper arms each having a different wiper arm style. The adapter can be a one-piece body or a multi-piece body having a cavity and openings for receiving distal ends or distal end features of each of the plurality of different wiper arms. The adapter can also include different tabs for engaging with (Continued)

openings, notches or other components on distal ends of each of the plurality of different wiper arms.

26 Claims, 18 Drawing Sheets

(52) U.S. Cl.
CPC ........... *B60S 1/3858* (2013.01); *B60S 1/4003* (2013.01); *B60S 1/4016* (2013.01); *B60S 1/4019* (2013.01); *B60S 2001/4029* (2013.01); *B60S 2001/4032* (2013.01)

(58) Field of Classification Search
CPC .... B60S 1/4048; B60S 1/3858; B60S 1/3849; B60S 2001/4029; B60S 2001/4032; B60S 2001/4012; B60S 1/4045; B60S 1/4067
USPC ..................................................... 15/250.32
See application file for complete search history.

(56) References Cited

U.S. PATENT DOCUMENTS

| | | | |
|---|---|---|---|
| 4,290,164 A * | 9/1981 | van den Berg | B60S 1/4003 15/250.32 |
| 4,337,547 A | 7/1982 | Hancou | |
| 4,343,062 A | 8/1982 | van den Berg | |
| 4,951,343 A | 8/1990 | Scorsiroli | |
| 5,084,933 A | 2/1992 | Buechele | |
| 5,289,608 A | 3/1994 | Kim | |
| 5,392,487 A | 2/1995 | Yang | |
| 5,611,103 A | 3/1997 | Lee | |
| 6,209,166 B1 * | 4/2001 | Westermann | B60S 1/4016 15/250.32 |
| 6,499,181 B1 * | 12/2002 | Kotlarski | B60S 1/40 15/250.43 |
| 6,640,380 B2 | 11/2003 | Rosenstein et al. | |
| 6,658,690 B1 | 12/2003 | Westermann et al. | |
| 6,779,223 B1 | 8/2004 | Roekens | |
| 7,055,207 B2 | 6/2006 | Coughlin | |
| 7,299,520 B2 | 11/2007 | Huang | |
| 8,261,403 B2 | 9/2012 | Ehde | |
| 8,850,653 B2 | 10/2014 | Depondt | |
| 8,938,847 B2 | 1/2015 | Avasiloaie et al. | |
| 8,959,701 B2 | 2/2015 | Kim et al. | |
| 8,973,209 B2 | 3/2015 | Depondt | |
| 9,073,519 B2 | 7/2015 | Depondt | |
| 9,108,595 B2 | 8/2015 | Tolentino et al. | |
| 9,174,611 B2 | 11/2015 | Tolentino et al. | |
| 9,333,948 B2 | 5/2016 | Depondt | |
| 9,381,893 B2 | 7/2016 | Tolentino et al. | |
| 9,387,829 B2 | 7/2016 | Wang | |
| 9,387,830 B2 | 7/2016 | Depondt | |
| 9,511,748 B2 * | 12/2016 | Piotrowski | B60S 1/4003 |
| 9,555,775 B2 | 1/2017 | Fournier et al. | |
| 9,718,444 B2 * | 8/2017 | Depondt | B60S 1/40 |
| 9,744,946 B2 | 8/2017 | Young, III et al. | |
| 9,889,822 B2 | 2/2018 | Tolentino et al. | |
| 10,005,431 B2 | 6/2018 | Tolentino et al. | |
| 10,023,154 B2 | 7/2018 | Piotrowski et al. | |
| 10,029,652 B2 | 7/2018 | Herinckx et al. | |
| 10,077,026 B2 | 9/2018 | Tolentino et al. | |
| 10,118,596 B2 | 11/2018 | Fournier et al. | |
| 10,166,951 B2 | 1/2019 | Kawashima et al. | |
| 10,189,445 B2 | 1/2019 | Tolentino et al. | |
| 10,363,905 B2 | 7/2019 | Tolentino | |
| 10,457,252 B2 | 10/2019 | Tolentino | |
| 10,464,533 B2 | 11/2019 | Tolentino et al. | |
| 11,208,077 B2 * | 12/2021 | Goh | B60S 1/381 |
| 2005/0028312 A1 | 2/2005 | Coughlin | |
| 2008/0289133 A1 | 11/2008 | Kim | |
| 2009/0151110 A1 | 6/2009 | Ku | |
| 2009/0199357 A1 | 8/2009 | Thienard | |
| 2009/0307862 A1 | 12/2009 | Boland et al. | |
| 2010/0205763 A1 | 8/2010 | Ku | |
| 2011/0005020 A1 | 1/2011 | Koppen et al. | |
| 2011/0247166 A1 | 10/2011 | Depondt et al. | |
| 2011/0277264 A1 * | 11/2011 | Ehde | B60S 1/4003 15/250.32 |
| 2012/0060315 A1 | 3/2012 | Avasiloaie et al. | |
| 2014/0000056 A1 * | 1/2014 | Bratec | B60S 1/4041 15/250.32 |
| 2014/0259504 A1 | 9/2014 | Piotrowski et al. | |
| 2014/0317875 A1 | 10/2014 | Tolentino et al. | |
| 2014/0352097 A1 * | 12/2014 | Cox | B60S 1/4019 15/250.32 |
| 2015/0251637 A1 * | 9/2015 | Tolentino | B60S 1/4048 15/250.32 |
| 2015/0258967 A1 | 9/2015 | Lepper et al. | |
| 2015/0353054 A1 | 12/2015 | Tolentino et al. | |
| 2017/0120874 A1 * | 5/2017 | Espinasse | B60S 1/3853 |
| 2017/0334403 A1 | 11/2017 | Kawashima | |

FOREIGN PATENT DOCUMENTS

| | | |
|---|---|---|
| CN | 101311043 A | 5/2007 |
| CN | 101674962 A | 5/2007 |
| CN | 104349952 A | 6/2012 |
| CN | 106573599 A | 7/2014 |
| CN | 102596659 B | 5/2015 |
| CN | 103687758 B | 12/2016 |
| DE | 202005021307 U1 | 12/2004 |
| DE | 102005016486 A1 | 4/2005 |
| DE | 202008011314 U1 | 8/2008 |
| DE | 102009000483 A1 | 9/2008 |
| DE | 102009043695 A1 | 10/2009 |
| DE | 20091046788 | 11/2009 |
| DE | 202011001119 U1 | 3/2011 |
| DE | 102010041152 A1 | 5/2011 |
| DE | 102012110738 A1 | 11/2011 |
| DE | 102011079783 A1 | 1/2013 |
| DE | 102015215709 A1 | 8/2015 |
| EP | 0231129 B1 | 5/1987 |
| EP | 0255352 B1 | 3/1988 |
| EP | 1849666 A1 | 4/2006 |
| EP | 25535231 A1 | 6/2011 |
| EP | 2546115 A2 | 7/2011 |
| EP | 2861467 B1 | 6/2012 |
| EP | 2501591 B1 | 8/2013 |
| EP | 3164303 B1 | 7/2014 |
| EP | 2360070 | 9/2014 |
| EP | 2736775 B1 | 10/2015 |
| ES | 2428821 T3 | 11/2013 |
| ES | 2552997 T3 | 12/2015 |
| FR | 2195956 A6 | 3/1974 |
| FR | 2254959 A6 | 11/1975 |
| IN | 2066DEN2012 | 8/2015 |
| JP | 5362118 B2 | 12/2013 |
| KR | 100891195 B1 | 4/2008 |
| KR | 100903374 B1 | 7/2008 |
| KR | 101381152 B1 | 4/2014 |
| PL | 2501591 T3 | 1/2014 |
| RU | 2381120 C2 | 10/2003 |
| RU | 2686270 C1 | 6/2012 |
| RU | 2014106909 A | 8/2017 |
| WO | 2004069618 A1 | 2/2003 |
| WO | 2006106006 A1 | 4/2005 |
| WO | 2006128763 A1 | 6/2005 |
| WO | 2009071372 A1 | 12/2007 |
| WO | 2011040743 | 9/2009 |
| WO | 2011060979 A1 | 5/2011 |
| WO | 2013186111 A1 | 6/2012 |
| WO | 2013013958 A1 | 1/2013 |
| WO | 2016000785 A1 | 7/2014 |
| WO | 2017080783 A1 | 11/2015 |
| WO | 2017/115880 * | 7/2017 |

OTHER PUBLICATIONS

Reflex Platinum Wiper Blade, Canadian Tire, Canada; retrieved from the Internet Feb. 11, 2020; <https://www.canadiantire.ca/en/pdp/reflex-platinum-wiper-blade-0211866p.html> (5 pages).

(56) References Cited

OTHER PUBLICATIONS

Rain X Silicone AdvantEdge; retrieved from the Internet Feb. 19, 2020; <https://www.rainx.com/silicone-advantedge/> (5 pages).
How to Install Rain-X Silicone AdvantEdge Wiper Blades; retrieved from the Internet Feb. 19, 2020; <https://www.rainx.com/installation-instructions/how-to-install-rain-x-silicone-advantedge-wiper-blades/> (2 pages).
Wiper Blade Removal Instructions; retrieved from the Internet Feb. 19, 2020; <https://www.rainx.com/instructions/wiper-blade-removal-instructions/> (1 page).
Rain X Silicone AdvantEdge Premium Wiper Blade; retrieved from the Internet Feb. 19, 2020; <https://shop.advanceautoparts.com/p/rain-x-silicone-advantedge-premium-beam-wiper-blade-22-inch-830022/11920347-P> (2 pages).

* cited by examiner

WINDSHIELD WIPER ARM ADAPTER, COUPLER AND ASSEMBLY

CROSS-REFERENCES TO RELATED APPLICATIONS

The present application is the National Stage of International Application No. PCT/US2019/018462 filed on Feb. 19, 2019 (published as WO 2019/161348), which claims benefit to U.S. Provisional Patent Application No. 62/632,199 filed Feb. 19, 2018, and U.S. Provisional Patent Application No. 62/713,712 filed Aug. 2, 2018. The entire contents of the above applications are incorporated by reference as if recited in full herein.

BACKGROUND

Vehicle manufacturers utilize a variety of windshield wiper arms and wiping elements. As will be appreciated, the wiping element wears over time and requires replacement. However, due to the variety of wiper arms, the end user is faced with an overwhelming number of choices to ensure that the proper wiping element is selected that is compatible with the wiper arm of their vehicle. As such, there is a need for an adapter and coupler that allows the end user to utilize a variety of wiping elements independent of the type of wiper arm that is present on their vehicle.

SUMMARY

In view of the foregoing, an adapter connects with a coupler that is connected with a wiper element. The adapter includes a body having a cavity and openings for receiving distal ends or distal end features of each of a plurality of different wiper arms each having a different wiper arm style.

According to another aspect, a coupler connects a wiper element with an adapter; the coupler includes a post that pivotally connects the coupler and the associated adapter together so as to define a pivot axis about which the associated adapter pivots. The post defines an obround cross-section in a plane orthogonal to the pivot axis. The coupler also includes a back wall that includes an adapter facing surface that faces the associated adapter and is generally orthogonal to the pivot axis of the post.

According to another aspect, a wiper set includes an adapter configured to receive at least one wiper arm. The adapter includes an adapter attachment mount having an entry passage defined by generally parallel entry passage sidewalls that define an entry passage width extending between the entry passage sidewalls and a pivot passage defined by a pivot passage sidewall having a major arc that terminates into the entry passage sidewalls so as to be in fluid communication with the entry passage sidewalls. The wiper set also includes a coupler that pivotally receives the adapter. The coupler includes a post that defines a pivot axis about which the adapter pivots and a back wall including an adapter facing surface that faces the adapter.

DETAILED DESCRIPTION

Figure 1:
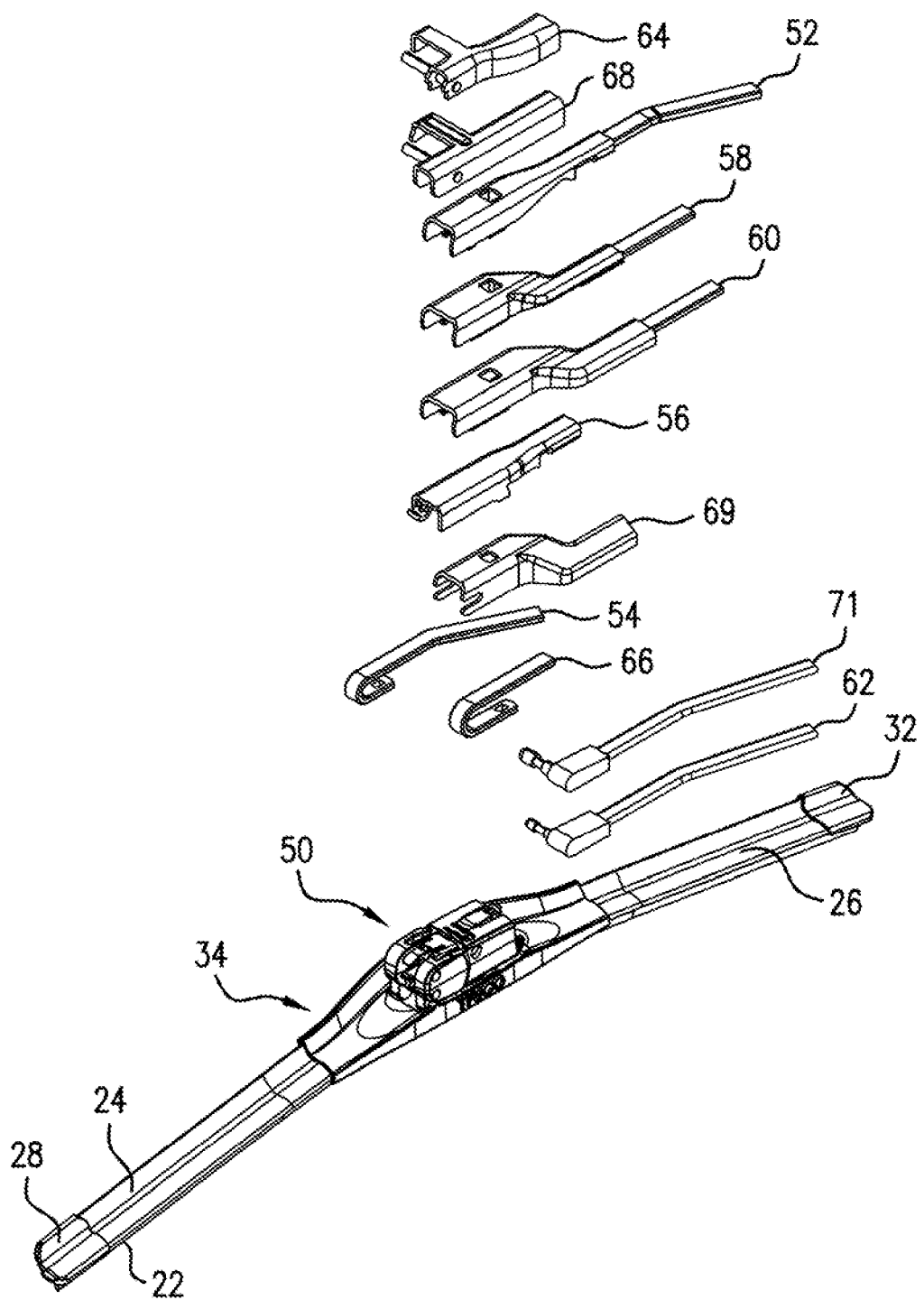
FIG. 1 is a perspective view of a windshield wiper assembly with a plurality of wiper arms and a coupler.

FIG. 1 depicts a windshield wiper assembly 20 useful to clean the glass windshield of a vehicle (not shown). The windshield wiper assembly 20 generally includes a wiping element 22 mounted to an airfoil, which can include a distal airfoil 24 and a proximal airfoil 26. The proximal airfoil 26 is positioned closer to a wiper motor (not shown) that drives the windshield wiper assembly 20 moving the windshield wiper assembly 20 across the windshield. A distal airfoil endcap 28 attaches to a distal end of the distal airfoil 24. A proximal airfoil end cap 32 attaches to a proximal end of the proximal airfoil 26. A wiper set 31 can include a coupler 34 and an adapter 50.

FIG. 1 also illustrates a variety of wiper arms including a push button 19 mm wiper arm 52, a standard hook wiper arm 54, a pinch tab wiper arm 56, a push button 22 mm short wiper arm 58, a push button 22 mm wiper arm 60, side lock 188 wiper arm 62, side pin wiper arm 64, large hook wiper arm 66, side pin offset wiper arm 68, an fz wiper arm 69, and a side lock 250 wiper arm 71. The coupler 34 is disposed along an intermediate position between and is connected with the distal airfoil 24 and the proximal airfoil 26. A spring (not visible) can be provided between the airfoil 24, 26 and the wiping element 22 to urge the wiping element toward the windshield.

With reference to FIGS. 2A-2E, the coupler 34 includes a back wall 36 which defines an adapter-facing surface 38. The coupler 34 also includes an adapter attachment, which can be an integrally formed post 35. The post 35 allows for a pivotal connection between the coupler 34 and the adapter 50. The post defines a pivot axis 37 about which the associated adapter 50 pivots. Further, the post 35 can define an obround cross-section in a plane orthogonal to the pivot axis 37.

The back wall 36 of the coupler 34 can be generally orthogonal to the pivot axis 37. The post can include a first post portion 35a and a second post portion 35b that are disposed on the pivot axis 37 and can be laterally spaced from one another. The post 35 can also include a pair of curved surfaces 43a, 43b that are separated by a pair of flat surfaces 45a, 45b.

The coupler 34 can also include a base wall 47 with a base surface 47a that is generally orthogonal to the back wall 36. The coupler 34 can also include a limit ledge 49 that extends from the adapter facing surface 41 toward the adapter 50 for contact with a stop member 51 of the adapter 50 as will be described in more detail hereinafter.

The coupler 34 can define a first inclusive angle 53 that extends from the base surface 47a to the limit ledge 49 about the pivot axis 37 and a second inclusive angle 55 that extends from the base surface 47a to a line that extends through the pivot axis 37 and is parallel to the pair flat surfaces 45a, 45b of the post 35. The second inclusive angle 55 can be greater than the first inclusive angle 53 and can be equal to 90 degrees.

The adapter 50 can be made of a variety of materials, including for example, various blends of plastics and polymers, without departing from the scope of this disclosure. Additionally, it will be appreciated that the adapter 50 could also be made by a variety of processes, including for example, 3-D printing and injection molding. It will also be appreciated that the following discussion relating to the adapter 50 is also applicable to a second adapter 1050, a third adapter 2050, a fourth adapter 3050, and a fifth adapter 4050 that will also be described in more detail hereinafter.

The adapter 50 can include an adapter attachment mount 57 having an entry passage 59 defined by generally parallel entry passage sidewalls 59a, 59b that define an entry passage width that extends between the entry passage sidewalls 59a, 59b. The adapter 50 can also include a pivot passage 61 defined by a pivot passage sidewall 61a having a major arc that terminates into the entry passage sidewalls 59a, 59b so as to be in fluid communication with the entry passage sidewalls 59a, 59b. The major arc of the pivot passage 61 defines a pivot passage diameter that is greater than the entry passage width. The entry passage 59 is configured to slidingly receive the coupler 34 and the pivot passage 61 is configured to pivotally receive the coupler 34.

Figure 2A:
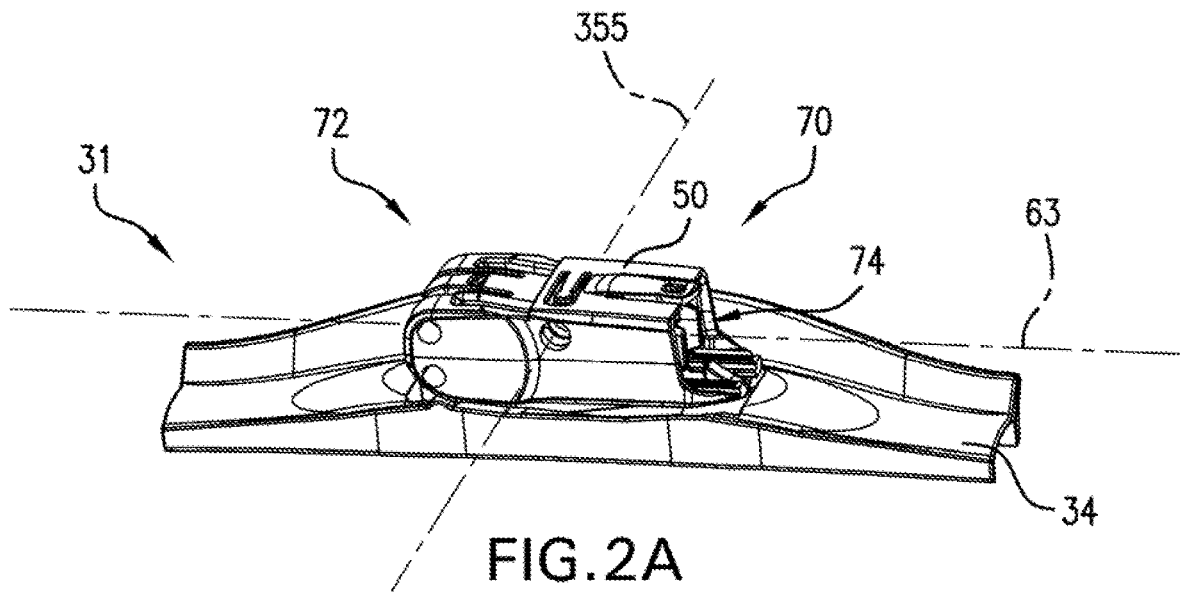
FIG. 2A is a perspective view of a wiper set in an operation mode, non-removable stage.
Figure 2B:
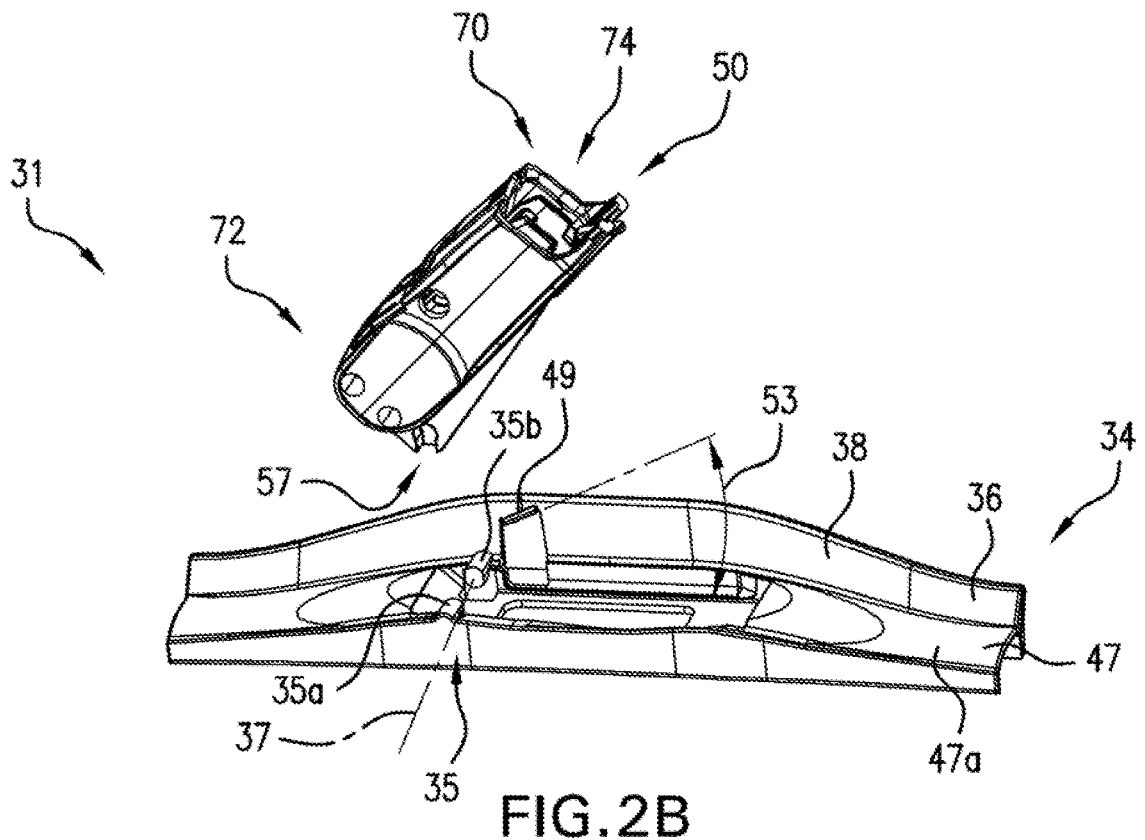
FIG. 2B is a perspective view of the coupler and adapter separated from one another showing a first inclusive angle.
Figure 2C:
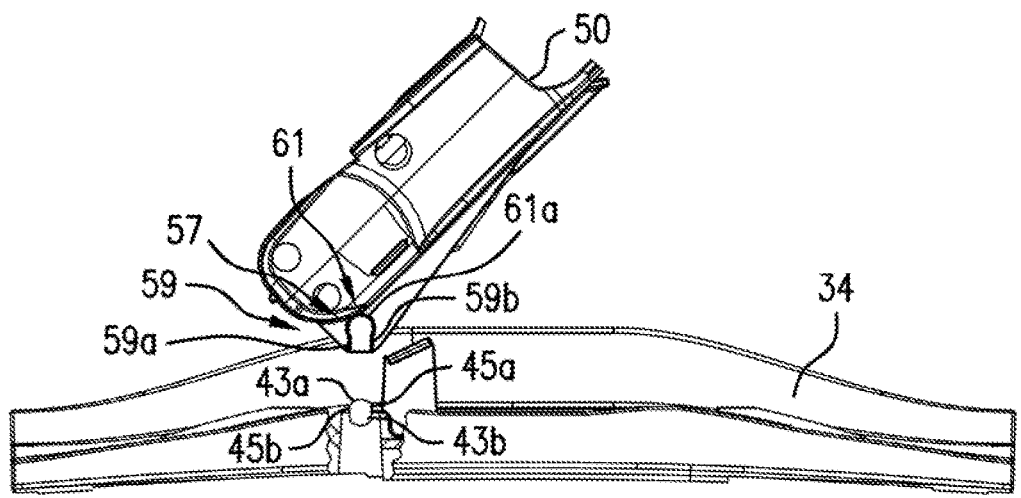
FIG. 2C is a perspective view of the wiper set.
Figure 2D:
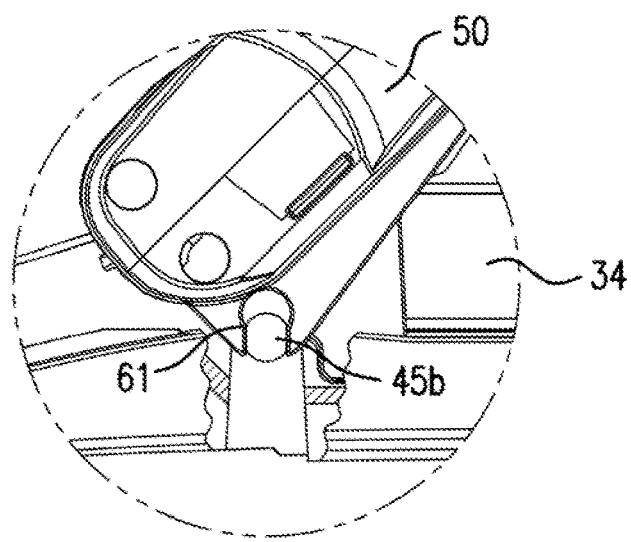
FIG. 2D is a partial perspective view of the wiper set in an installation mode.

As shown in FIG. 2D, the wiper set 31 defines an installation mode when the post 35 is received in the entry passage 59 and adapter 50 is not pivotable. The wiper set also defines an operation mode when the post 35 is received in the pivot passage 61 and the adapter 50 is pivotable as illustrated in FIGS. 2A and 2E.

Figure 2E:
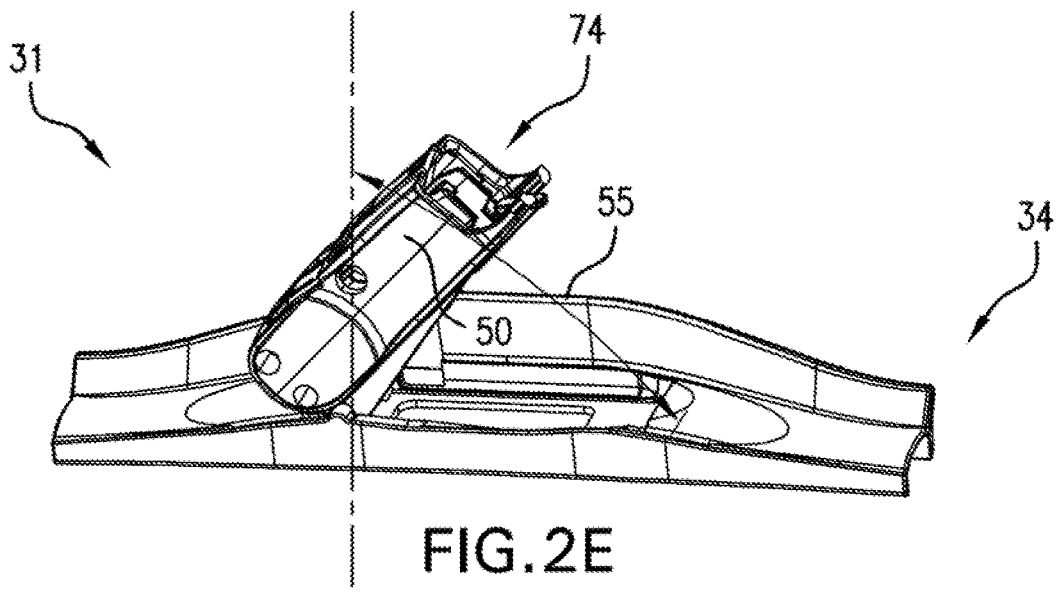
FIG. 2E is a perspective view of the wiper set in an operation mode, removable stage.

The limit ledge 49 of the coupler 34 and the stop member 51 of the adapter 50 interact with one another so as to divide the operation mode into a separable stage in which the adapter 50 and the coupler 34 are separable from one another as shown in FIG. 2E and a non-removable stage in which the adapter 50 and the coupler 34 are not separable from one another as illustrated in FIG. 2A.

The adapter 50 can be a one-piece body having a proximal end 70 and a distal end 72. With continued reference to FIGS. 2A-2E, the proximal end 70 of the adapter 50 is open to a cavity 74. The distal end 72 is curved and primarily closed. The adapter 50 defines a longitudinal axis 63 that extends between the proximal end 70 and the distal end 72.

With reference to FIGS. 3-6, the adapter 50 includes a plurality of attachment elements, which will be later described, to allow each of the wiper arms 52-71 (shown in FIG. 1) to connect with the adapter 50. The adapter 50 includes an upper proximal tab 76 that cooperates with the push button 19 mm wiper arm 52, the push button 22 mm short wiper arm 58, the push button 22 mm wiper arm 60, and the fz wiper arm 69 to connect each of these wiper arms 52, 58, 60, and 69 to the adapter 50.

The adapter 50 also includes an upper distal tab 78 that cooperates with the pinch tab wiper arm 56 for connecting the pinch tab wiper arm 56 with the adapter 50. The adapter 50 also includes a cutout 82 and a pair of aligned upper transverse openings 86 that cooperate with the side pin wiper arm 64 and the side pin offset wiper arm 68 for connecting the side pin wiper arm 64 and the side pin offset wiper arm 68 to the adapter 50. The adapter 50 includes a first lower tab 90 that cooperates with the large hook wiper arm 66 to selectively connect the large hook wiper arm 66 with the adapter 50.

The adapter 50 also includes a second lower tab 92 that selectively cooperates with the standard hook wiper arm 54 to connect the standard hook wiper arm 54 with the adapter 50. The adapter 50 also includes a lower transverse opening 94 that cooperates with a vertically central distal end tab 96 and a vertically lower distal end tab 98 to connect the side lock 188 wiper arm 62 with the adapter 50. The adapter 50 also includes a proximal transverse opening 95 that cooperates with a transverse tab 97 to connect the side lock 250 wiper arm 71 with the adapter 50.

The cavity 74 is appropriately dimensioned to receive the push button 19 mm wiper arm 52, the standard hook wiper arm 54, the pinch tab wiper arm 56, the push button 22 mm short wiper arm 58, the push button 22 mm wiper arm 60, the side pin wiper arm 64, the large hook wiper arm 66, the side pin offset wiper arm 68, and the fz wiper arm 69. The aligned upper transverse openings 86 receive a portion of the side pin wiper arm 64 and the side pin offset wiper arm 68, the lower transverse opening 94 receives a portion of the side lock 188 wiper arm 62, and the proximal transverse opening 95 receives a portion of the side lock 250 wiper arm 71.

Figure 3:
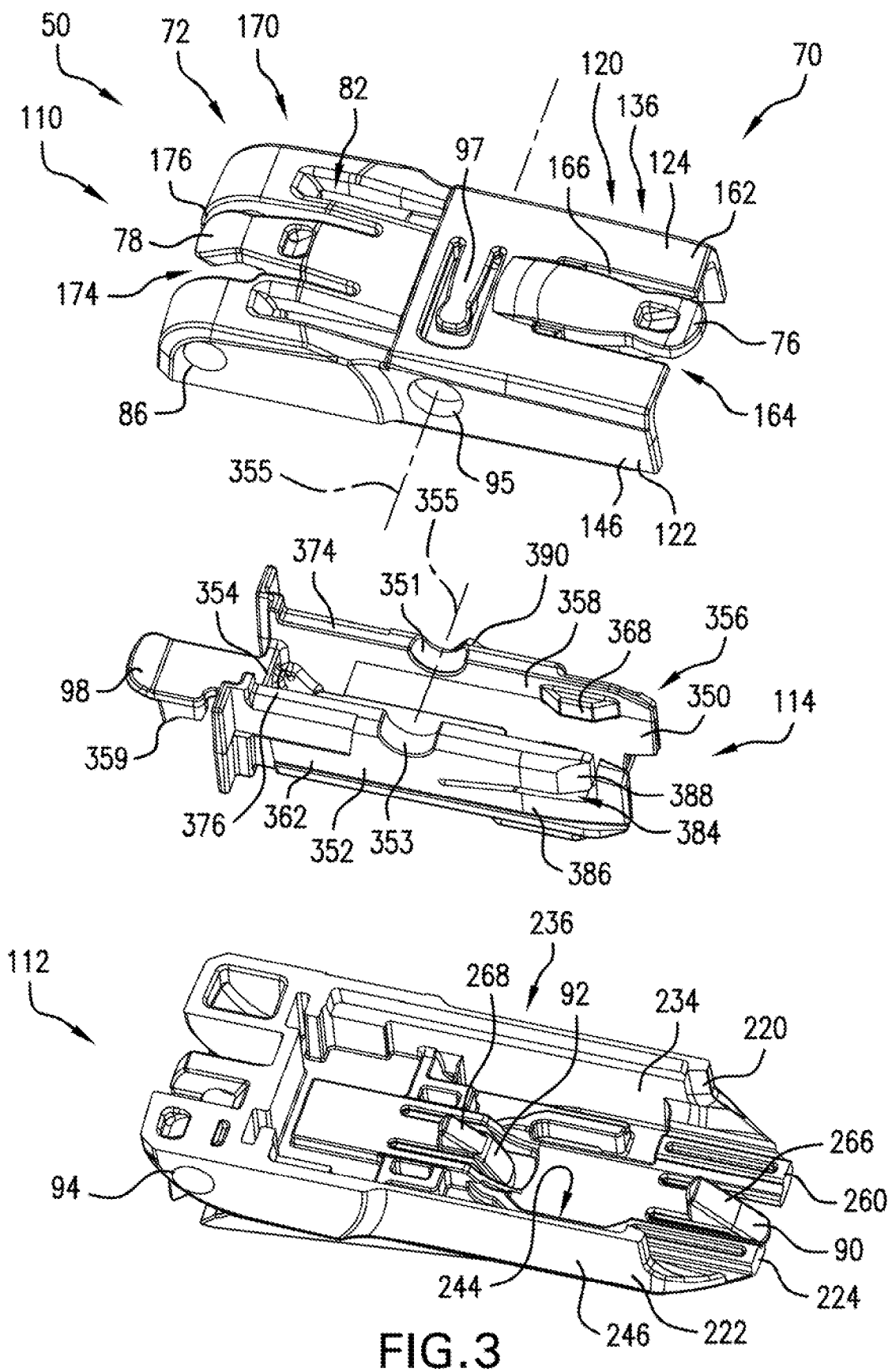
FIG. 3 is an exploded front perspective view of the adapter of FIG. 1.
Figure 4:
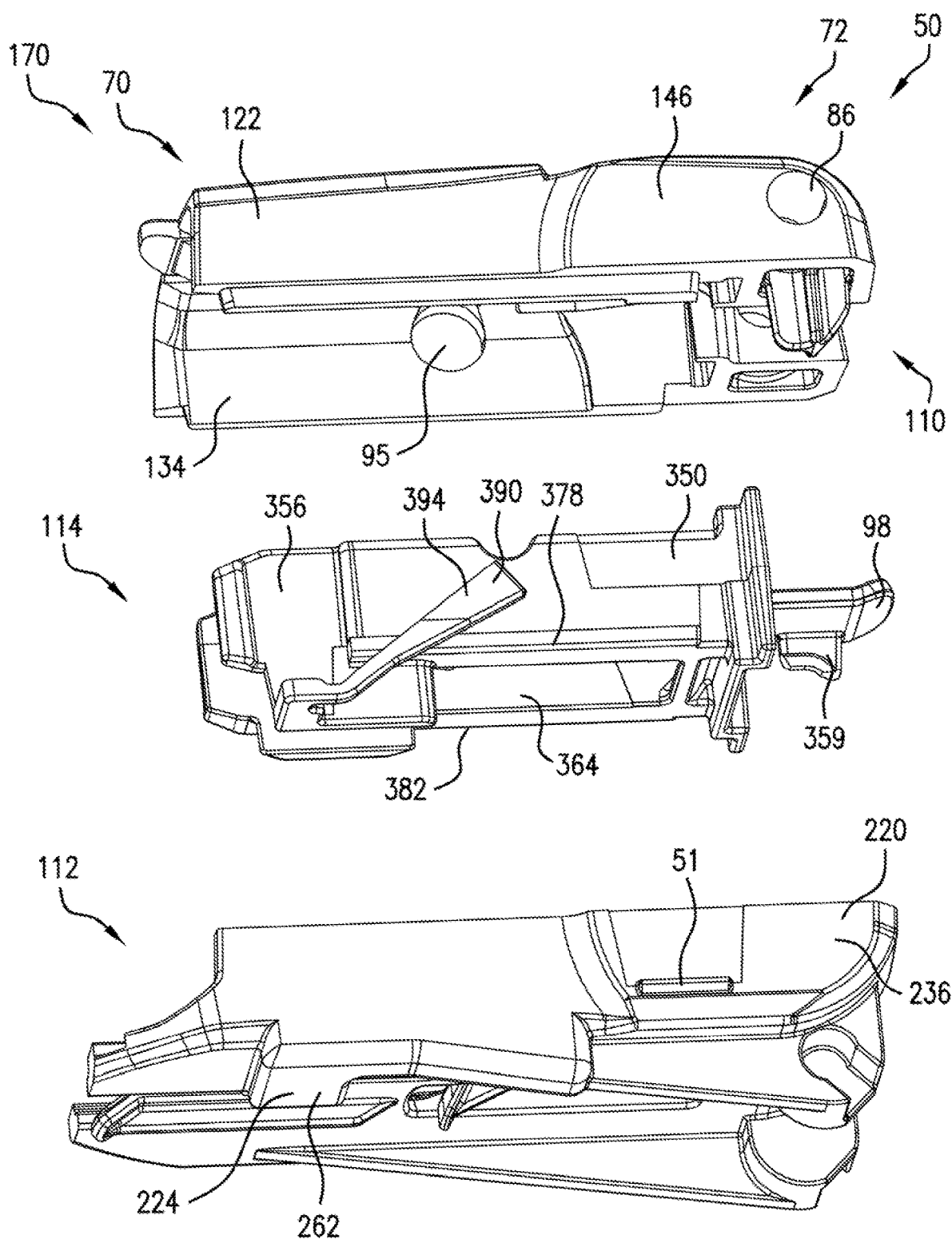
FIG. 4 is an exploded rear perspective view of the adapter of FIG. 1.

FIGS. 3-4 depict exploded views of the adapter 50. The adapter 50 in the illustrated embodiment includes an upper body 110, a lower body 112, and an inner body 114 positioned between the upper body 110 and the lower body 112. The upper body and 110 and the lower body 112 cooperate to define the cavity 74 that extends from the proximal end 70 toward the distal end 72 of the adapter 50. The adapter 50 is shown as being manufactured from separate parts that are finally assembled and joined to each other to provide a one-piece body. The adapter 50 can be made from fewer separate components or a greater number of separate components than those shown in the figures.

In the illustrated embodiment, the upper body 110 includes the upper proximal tab 76, the upper distal tab 78, the cutout 82 and the aligned upper transverse openings 86, the proximal transverse opening 95, and the transverse tab 97. When viewed from the proximal end 70, the upper body 110 has a general upside down U-shaped configuration so as to include an inner side wall section 120, an outer side wall section 122, and a top wall section 124 bridging between the inner side wall section 120 and the outer side wall section 122.

The upper body inner side wall section 120 includes an interior surface 134 and an exterior surface 136. The exterior surface 136 is substantially smooth and planar in the illustrated embodiment and faces toward the adapter-facing surface 38 when the adapter 50 is connected with the coupler 34. The upper body outer side wall section 122 includes an interior surface 144 and an exterior surface 146.

The upper body top wall section 124 includes an interior surface 156 and an exterior surface 162. A first proximal end slot 164 and a second proximal end slot 166 each extend from the proximal end 70 longitudinally toward the distal end 72 to define the upper proximal tab 76. A barb 168 extends downwardly from the upper proximal tab 76 to engage in an opening provided in the push button 19 mm wiper arm 52, the push button 22 mm short wiper arm 58, the push button 22 mm arm 60, or the fz wiper arm 69 (see FIG. 1).

The upper body 110 also includes a distal end portion 170 and a first distal slot 174 and a second distal slot 176 define the upper distal tab 78. A projection 178 extends downwardly from the upper distal tab 78 to engage inside an opening provided in the pinch tab wiper arm 56 (see FIG. 1). The cutout 82 is located nearer to the upper body inner side wall section 120 as compared to the outer side wall section 122.

In the illustrated embodiment, the lower body 112 includes the first lower tab 90, the second lower tab 92, and the lower transverse opening 94. When viewed from the proximal end 70 (see FIG. 2), the lower body 112 has a general U-shaped configuration and includes an inner side wall section 220, an outer side wall section 222, and a bottom wall section 224 bridging between the inner side wall section 220 and the outer side wall section 222.

The lower body inner side wall section 220 also includes an interior surface 234 and an exterior surface 236. The exterior surface 236 is substantially smooth and planar in the illustrated embodiment and faces toward the adapter-facing surface 38 when the adapter 50 is connected with the coupler 34. The stop member 51 extends from the exterior surface 236 toward the adapter-facing surface 38 of the adapter 50 and is closer to the distal end 72 than the proximal end 70. The stop member 51 interacts with the limit ledge 49 so as to provide an overcomable pivot stop for the adapter 50 with respect to the coupler 34 in a detent manner. The lower body outer side wall section 222 includes an interior surface 244 and an exterior surface 246.

The bottom wall section 224 includes an interior surface 260 and an exterior surface 262. The bottom wall section 224 defines the first lower tab 90 and the second lower tab 92. The first lower tab 90 is positioned closer to the proximal end 70 of the adapter 50 than the second lower tab 92. Thus, the second lower tab 92 is between the first lower tab 90 and the distal end 72 of the adapter 50 in a plan view of the adapter 50.

Figure 5:
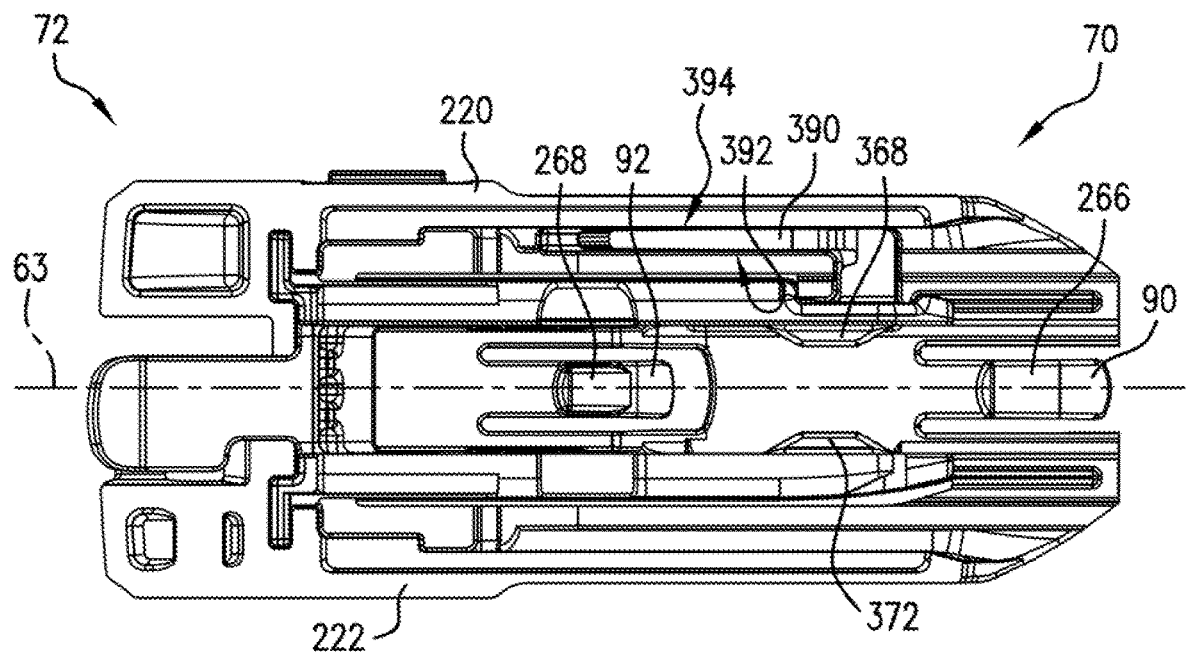
FIG. 5 is a plan view of an adapter lower body and an adapter inner body.
Figure 6:
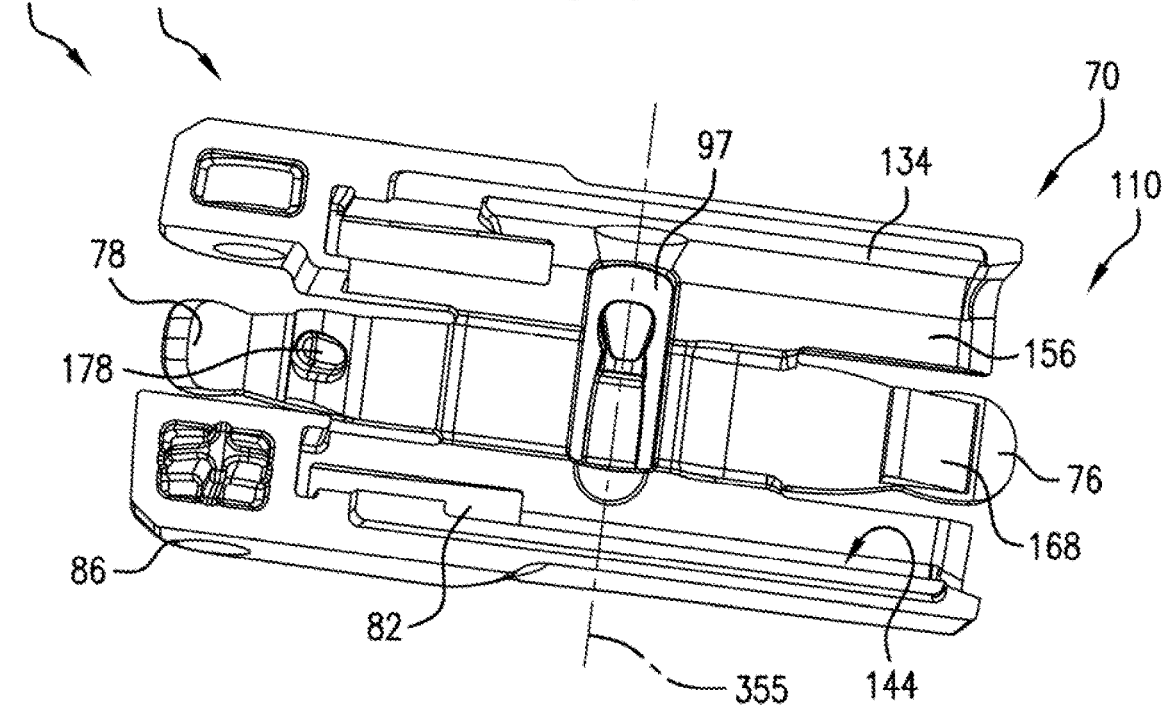
FIG. 6 is a bottom perspective view of an adapter upper body.

With reference to FIG. 5, a first barb 266 extends upwardly from the first lower tab 90 to engage in an opening provided in the large hook wiper arm 66 (FIG. 1). A second barb 268 extends upwardly from the second lower tab 92 to engage in an opening provided in the standard hook wiper arm 54 (FIG. 1). When a distal end of either arm of the standard hook wiper arm 54 or the large hook wiper arm 66 are received in the cavity 74, respective barbs 266, 268 are received in respective openings near the distal end of the respective wiper arms 54, 66.

The inner body 114 includes an inner tongue 350 and an outer tongue 352. The inner tongue 350 and the outer tongue 352 each extend toward the proximal end 70 of the adapter 50 from a cross member 354 that connects the inner tongue 350 and the outer tongue 352 together. The lower distal tab 98 can extend from the cross member 354. A barb 359 can extend from the lower distal tab 98 away from the top wall section 124 of the upper body 110 to cooperate with the lower transverse opening 94 to connect the side lock 188 wiper arm 62 with the adapter 50.

The inner tongue 350 includes an exterior surface 356, which is generally planar, vertically oriented and offset from the interior surface 134 of the upper body inner side wall section 120 and the interior surface 234 of the lower body inner side wall section 220. The inner tongue 350 also includes an interior surface 358 that faces towards the outer tongue 352. Similarly, the outer tongue 352 includes an exterior surface 362 parallel to the exterior surface 356 of the inner tongue 350. The outer tongue 352 also includes an interior surface 364 that is generally vertically oriented, parallel to and offset from the interior surface 358 of the inner tongue 350.

An inner protuberance 368 extends inwardly from the interior surface 358 of the inner tongue 350 towards the outer tongue 352. Similarly, another inner protuberance 372 is provided on the interior surface 364 of the outer tongue 352 and faces toward the inner tongue 350. The inner protuberances 368 and 372 engage with the standard hook wiper arm 54 and the large hook wiper arm 66 when either the standard hook wiper arm 54 or the large hook wiper arm 66 is received within the cavity 74 of the adapter 50 and more particularly between the inner tongue 350 and the outer tongue 352.

The inner tongue inner protuberance 368 and the outer tongue inner protuberance 372 are disposed between the first lower tab 90 and the second lower tab 92 along the longitudinal axis 63 in the plan view of the adapter 50. The inner tongue 350 defines an inner tongue proximal opening 351 and the outer tongue 352 defines an outer tongue proximal opening 353. The adapter 50 defines a lateral axis 355 that extends between the inner tongue proximal opening 351 and the outer tongue proximal opening 353. The transverse tab 97 is disposed along the lateral axis 355 in the plan view. The proximal transverse opening 95 of the outer side wall section 122 is in registry with the inner tongue proximal opening 351 and the outer tongue proximal opening 353 to receive the side lock 250 wiper arm 71.

The inner tongue 350 includes an inner tongue upper edge 374 and the outer tongue 352 includes an outer tongue upper edge 376. The upper edges 374 and 376 are offset vertically beneath the interior surface 156 of the upper body top wall section 124. This allows horizontally (generally) disposed sections of the push button 19 mm wiper arm 52, the pinch tab wiper arm 56, the push button 22 mm short wiper arm 58, and the push button 22 mm wiper arm 60 to be received in the cavity 74.

The inner tongue 350 also includes an inner tongue lower edge 378 and the outer tongue 352 includes an outer tongue lower edge 382. The lower edge 378 of the inner tongue 350 is co-planar with the lower edge 382 of the outer tongue 352. The outer tongue 352 defines a bifurcating slot 384 that creates a fixed portion 386 and a finger portion 388 of the outer tongue 352. The finger portion 388 of the outer tongue 352 is elastically deformable.

The adapter 50 also includes a wedge 390 that is elastically attached to the inner body 114. The wedge 390 includes an inner face 392 that faces toward the inner body 114 and an outer face 394 that faces away from the inner body 114, and also in a direction opposite the inner face 392. The wedge 390 can extend from the exterior surface 356 of the inner tongue 350 of the inner body 114 from the proximal end 70 of the adapter 50 toward the distal end 72 of the adapter 50.

The wedge 390 can exert a lateral biasing force on the push button 22 mm arm 60 and the push button 22 mm short wiper arm 58 toward the inner side wall section 120 of the upper body 110. Further, the wedge 390 can be laterally disposed between the inner body 114 and the push button 22 mm arm 60 and the push button 22 mm short wiper arm 58 when the arms 60, 58 are received in the adapter 50.

Further still, the wedge 390 can be laterally disposed between the inner side wall section 120 of the upper body 110 and the push button 19 mm wiper arm 52, the pinch tab wiper arm 56, or the fz wiper arm 69 when said wiper arms 52, 56, 69 are received in the adapter 50. Thus, the wedge 390 can exert a lateral biasing force on the push button 19 mm wiper arm 52, the pinch tab wiper arm 56, and the fz wiper arm 69 toward the exterior surface 356 of the inner tongue 350 of the inner body 114.

Figure 2F:
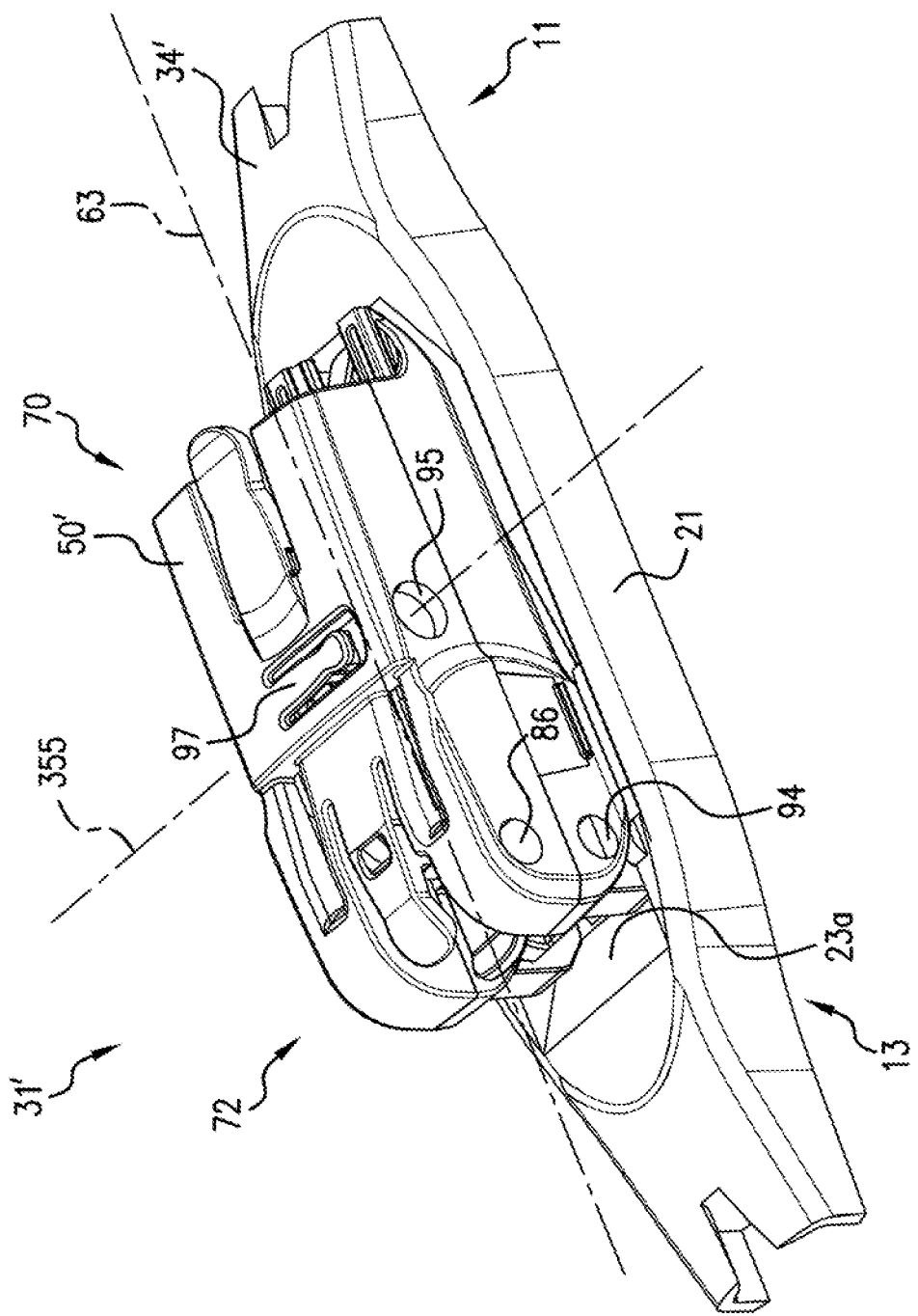
FIG. 2F is a perspective view of an alternative wiper set.

With reference to FIGS. 2F-2J, and more particularly to FIG. 2F, an alternative wiper set 31' that include an alternative coupler 34' and an alternative adapter 50' are shown. Unless otherwise noted, the alternative coupler 34' and the alternative adapter 50' share the same structure and features as the coupler 34 and the adapter 50, respectively, that are illustrated in FIGS. 1-2E and 3-6. For example, the alternative adapter 50' can engage with all of the wiper arms illustrated in FIG. 1 in the same manner as previously described with respect to the adapter 50. However, the alternative adapter 50' can interact with the alternative coupler 34' in a manner as will be described in more detail hereinafter.

Figure 2G:
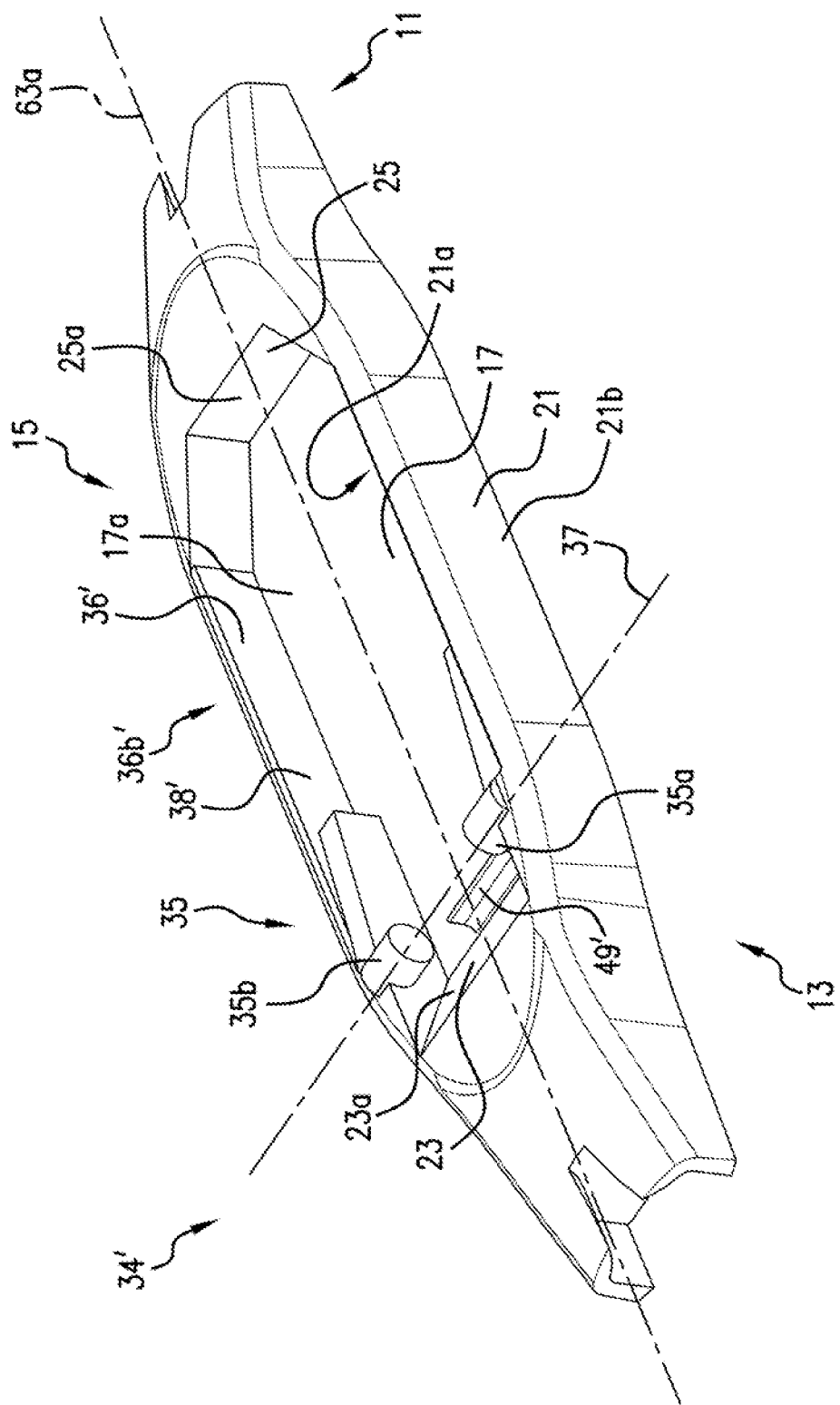
FIG. 2G is a perspective view of an alternative coupler.

The alternative coupler 34' can include a proximal end 11 and a distal end 13 that share a common orientation with the proximal end 70 and distal end 72 of the alternative adapter 50' as illustrated in FIG. 2F. The alternative adapter 50' defines a longitudinal axis 63 that extends between the proximal end 70 and the distal end 72 and the alternative coupler 34' defines a longitudinal axis 63a that extends between the proximal end 11 and the distal end 13 of the coupler 34' (FIG. 2G). Further, the proximal transverse opening 95 of the alternative adapter 50' defines a lateral axis 355. The transverse tab 97 is disposed along the lateral axis 355 in the plan view.

Figure 2I:
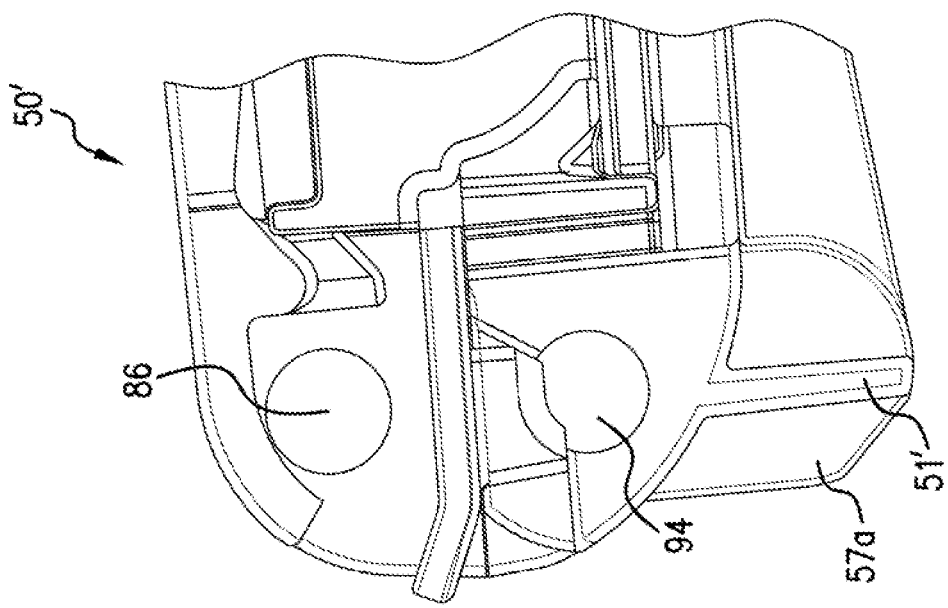
FIG. 2I is a cross-section of a forward end portion of the alternative adapter of FIG. 2H taken through a stop wall along a plane parallel to a longest dimension.
Figure 2H:
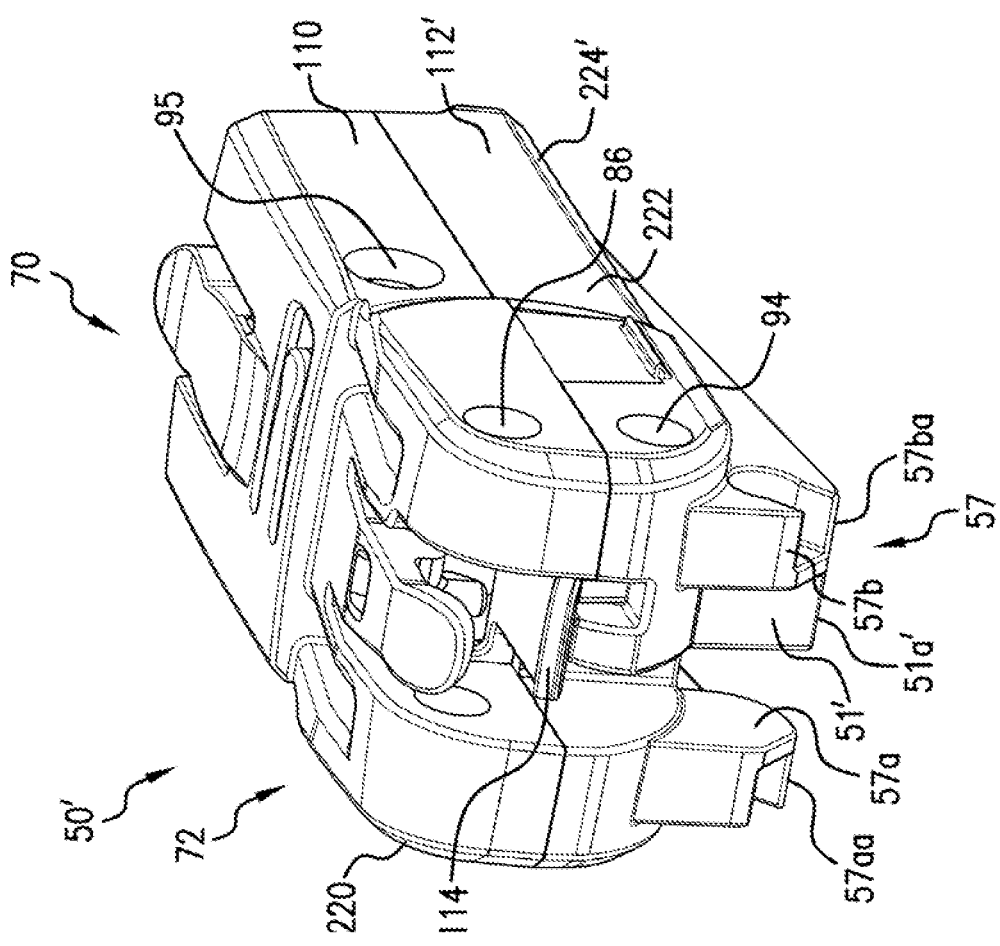
FIG. 2H is a perspective view of an alternative adapter.
Figure 2J:
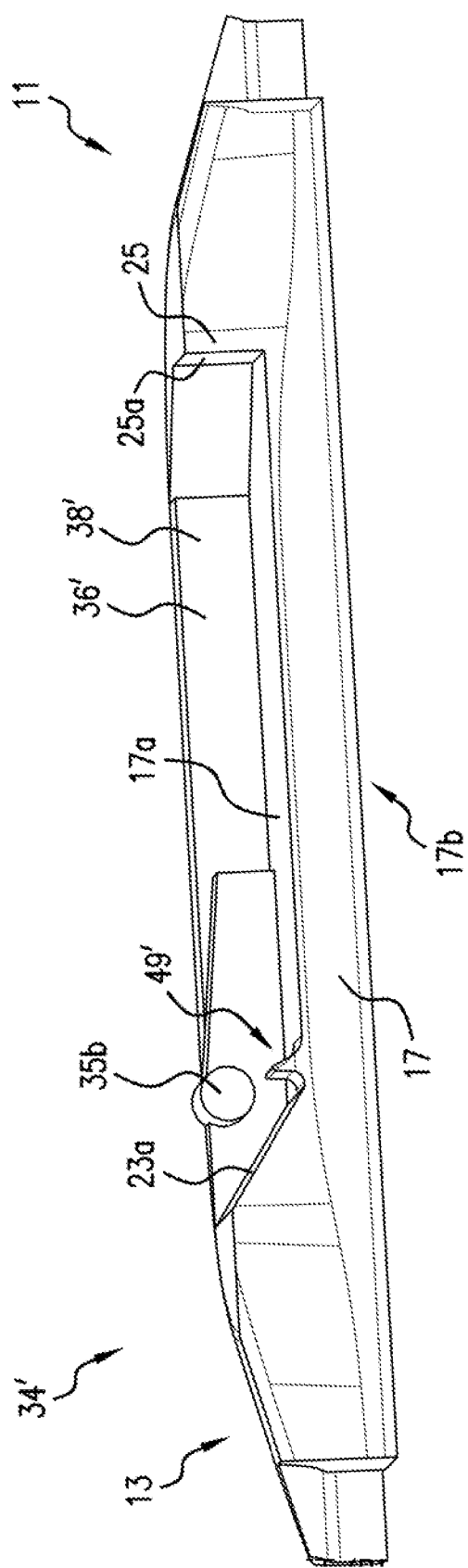
FIG. 2J is a cross-section of the alternative coupler of FIG. 2G taken through a stop wing along a plane parallel to a longest dimension.

With reference to FIGS. 2G and 2J, the alternative coupler 34' can define an adapter receiving depression 15. As illustrated, the depression 15 does not allow fluid communication through the alternative coupler 34'. However, it will be appreciated, that the depression 15 could entirely extend through the alternative coupler 34' so as to allow fluid communication therethrough (i.e., as a bore).

The depression 15 can be bounded by a floor 17 with an interior floor surface 17a that faces the alternative adapter 50'. The floor 17 can include an exterior floor surface 17b that faces in a direction that is opposite that the interior floor surface 17a faces. The depression 15 can also be bounded by a back wall 36' with an adapter-facing surface 38' and a back exterior surface 36b', a front wall 21 with a front interior surface 21a and a front exterior surface 21b, a distal wall 23 with a distal interior surface 23a, and a proximal wall 25 with a proximal interior surface 25a. The back wall 36' and the front wall 21 can be disposed at opposite lateral ends of the coupler 34'. Further, the distal wall 23 and the proximal wall 25 are disposed at opposite longitudinal ends of the coupler 34'.

The adapter-facing surface 38' of the back wall 36' can face the front interior surface 21a. Further, the front interior surface 21a can face in a direction that is opposite a direction in which the front exterior surface 21b faces. The front interior surface 21a is spaced from the adapter facing surface 38'. Further, the distal interior surface 23a and the proximal interior surface 25a can be disposed at opposite ends of the alternative coupler 34' so as to be at the distal end 13 and the proximal end 11, respectively, of the alternative coupler 34' and facing toward one another. The distal wall 23 and the proximal wall 25 can cooperate to connect the back wall 36' and the front wall 21 together.

With continued attention to FIG. 2G, the alternative coupler 34' also includes an adapter attachment, which can be an integrally formed post 35. The post 35 allows for a pivotal connection between the alternative coupler 34' and the alternative adapter 50'. The post defines a pivot axis 37 about which the alternative adapter 50' pivots. Further, the post 35 can define an obround cross-section in a plane orthogonal to the pivot axis 37. The post 35 can include a first post portion 35a and a second post portion 35b that are disposed on the pivot axis 37 and can be laterally spaced from one another.

The back wall 36' and more particularly the adapter facing surface 38', the front interior surface 21a of the front wall 21, and the proximal interior surface 25a of the proximal wall 25 of the alternative coupler 34' can be generally orthogonal to the pivot axis 37. As illustrated, the distal interior surface 23a of the distal wall 23 can have a ramp-like layout such that the distal interior surface 23a does not face in a same direction as the adapter facing surface 38', the front interior surface 21a of the front wall 21, or the proximal interior surface 25a of the proximal wall 25.

As shown in FIG. 2G, and more particularly in FIG. 2J, the alternative coupler 34' can also include a stop wing 49' that is disposed at the distal end 13 of the alternative coupler 34' for interaction with a stop member 51' (FIGS. 2H-2I) of the alternative adapter 50' as will be described in more detail hereinafter. As illustrated, the stop wing 49' can upwardly extend from the floor 17, and more particularly the interior floor surface 17a. The stop wing 49' can be spaced from the front wall 21, the back wall 36', the proximal wall 25, and the distal wall 23. Further, the stop wing 49' can be laterally disposed between, and spaced from, the first post portion 35a and the second post portion 35b in a plan view of the alternative coupler 34'.

Thus, the stop wing 49' can be disposed so as to be below the pivot axis 37. However, as noted hereinbefore, the floor 17 could be eliminated and the depression 15 could instead be a bore that would extend through the alternative coupler 34'. In that situation, the stop wing 49' could instead be attached to and extend from one or more of the walls of the coupler 34'.

The stop wing 49' can define a stop wing length that extends in a lateral direction of the alternative coupler 34' (i.e., parallel to the pivot axis 37). Further, the stop wing 49' can define a stop wing width that extends in a longitudinal direction of the alternative coupler 34' (i.e., parallel to the longitudinal axis 63a). As illustrated, the stop wing length is greater than the stop wing width. The stop wing 49' also upwardly extends from the floor 17 so as to define a stop wing height.

As shown in FIG. 2G, the length of the stop wing 49' can be constant. However, the width of the stop wing 49' may be non-constant. For example, the width of the stop wing 49' can decrease as the stop wing 49' extends upward from the floor 17. As illustrated, the stop wing 49' is spaced from the front interior surface 21a and also the adapter facing surface 38' of the rear wall 36'.

With special attention to FIGS. 2H-2I, the alternative adapter 50' can include an upper body 110, a lower body 112', and an inner body 114 positioned between the upper body 110 and the lower body 112. The lower body 112' can have a general U-shaped configuration and includes an inner side wall section 220, an outer side wall section 222, and a bottom wall section 224' bridging between the inner side wall section 220 and the outer side wall section 222.

Like the adapter 50, the alternative adapter 50' can include an adapter attachment mount 57 for engagement with the coupler 34'. The adapter attachment mount 57 can be disposed at the distal end 72 of the adapter 50' and be integral to the lower body 112'. The adapter attachment mount 57 can include an inner attachment mount 57a and an outer attachment mount 57b disposed at opposite lateral ends of the alternative adapter 50'. The inner attachment mount 57a and the outer attachment mount 57b are configured to engage the second post portion 35b and the first post portion 35a, respectively, of the alternative coupler 34' as described hereinbefore with respect to the wiper set 31.

The lower body 112' of the alternative adapter 50' can include the stop member 51'. As illustrated, the stop member 51' may be integral to the lower body 112'. The stop member 51' can downwardly extend from the bottom wall section 224' for engagement with the stop wing 49'. The stop member 51' of the alternative adapter 50' can be laterally disposed between the inner attachment mount 57a and the outer attachment mount 57b. As illustrated, the stop member 51' is offset from a lateral center of the alternative adapter 50' so that the stop member 51' directly contacts the outer attachment mount 57b.

The stop member 51' downwardly extends from the bottom wall section 224' such that an overall height of the alternative adapter 50' is not increased, as compared to the adapter 50. Further, the orientation of the stop member 51' is such that a bottom edge 51a' of the stop member 51' does not vertically extend below an inner attachment mount bottom edge 57aa of the inner attachment mount 57a or an outer attachment mount bottom edge 57ba of the outer attachment mount 57b. Thus, the bottom edge 51a' of the stop member 51a, the bottom edge 57aa of the inner attachment mount 57a, and the bottom edge 57ba of the outer attachment mount 57b are coplanar and define a lowest horizontal plane of the alternative adapter 50'.

As shown in FIG. 2I, the stop member 51' can be of a thin wall construction in which a height (i.e., extending along a vertical axis) is greater than a length, which in FIG. 2I would be a left-right direction (i.e., extending along the longitudinal axis 63). Further, the stop member 51' can define a width (i.e., extending along the lateral axis 355) that may be equal to a width of either the inner attachment mount 57a or the outer attachment mount 57b.

The interaction between the stop member 51' of the alternative adapter 50' and the stop wing 49' of the alternative coupler 34' is the same as the interaction between the stop member 51 of the adapter 50 and the limit ledge 49 of the coupler 34. Namely, the interaction between the stop member 51' and the stop wing 49' provide an overcomable pivot stop for the alternative adapter 50' with respect to the alternative coupler 34' in a detent manner. Thus, for brevity, the description is omitted.

Figure 7:
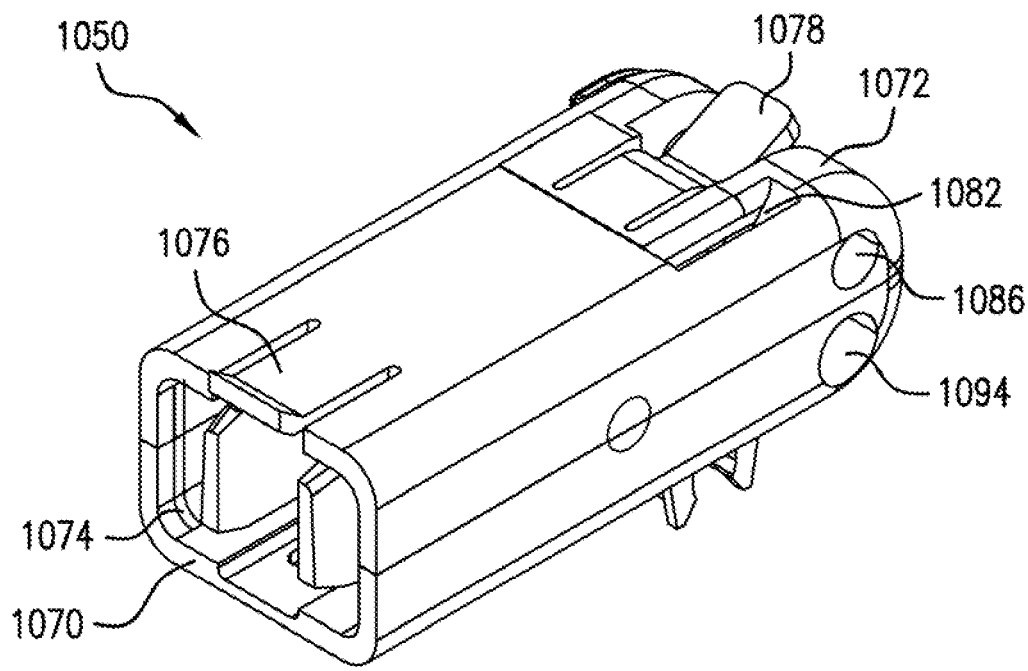
FIG. 7 is an upper distal end perspective view of an adapter.

With reference to FIGS. 7-10, a second adapter 1050 is shown. The second adapter 1050 includes a plurality of attachment elements, which will be later described, to allow each of the wiper arms 52-66 shown in FIG. 1 to connect with the second adapter 1050. With reference to FIG. 7, the second adapter 1050 includes an upper proximal tab 1076 that cooperates with the push button 19 mm wiper arm 52, the push button 22 mm short wiper arm 58, and the push button 22 mm wiper arm 60 to connect each of these wiper arms 52, 58 and 60 to the second adapter 1050.

Figure 8:
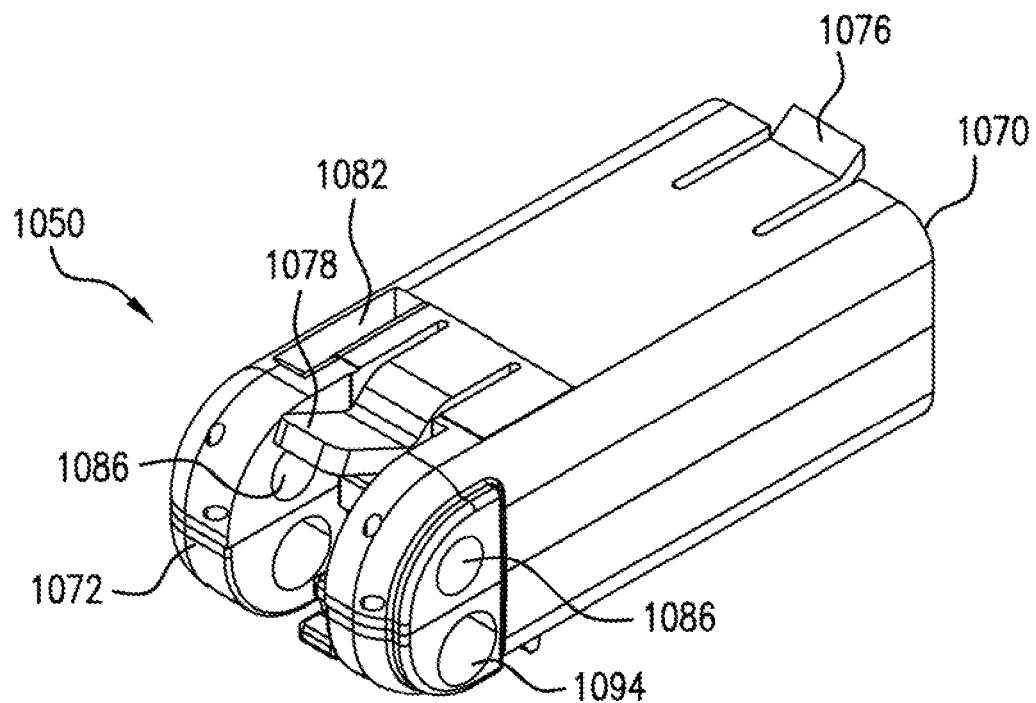
FIG. 8 is an upper proximal end perspective view of the adapter shown in FIG. 7.

With specific reference to FIGS. 7 and 8, the second adapter 1050 also includes an upper distal tab 1078 that cooperates with the pinch tab wiper arm 56 for connecting the pinch tab wiper arm 56 with the second adapter 1050. The second adapter 1050 also includes a cutout 1082 and a pair of aligned upper transverse openings 1086 that cooperate with the side pin wiper arm 64 for connecting the side pin wiper arm 64 to the second adapter 1050.

Figure 9:
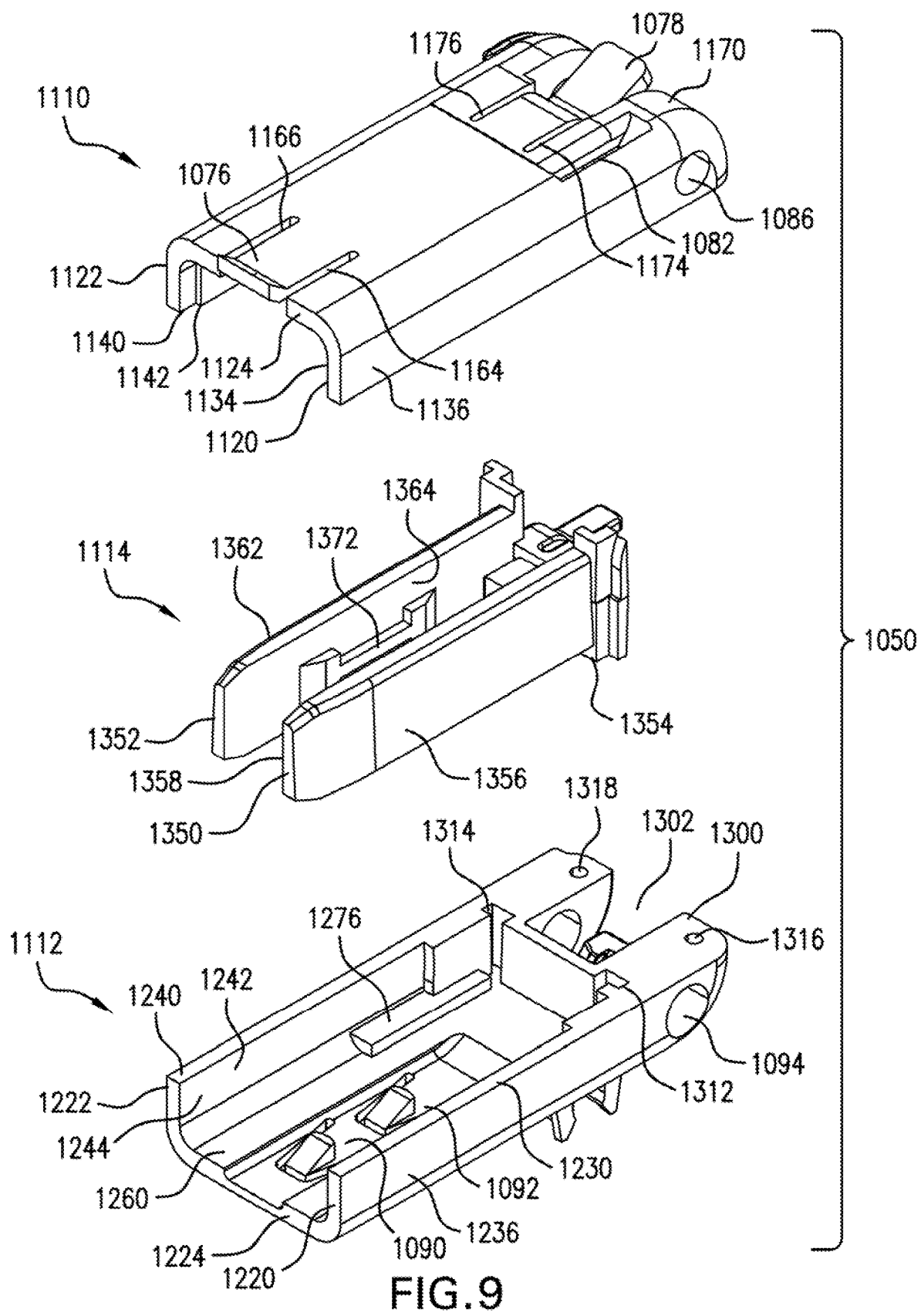
FIG. 9 is an exploded perspective view of the adapter shown in FIG. 7.

With reference to FIG. 9, the second adapter 1050 includes a first lower tab 1090 that cooperates with the large hook wiper arm 66 to connect the large hook wiper arm 66 with the second adapter 1050. The second adapter 1050 also includes a second lower tab 1092 that cooperates with the standard hook wiper arm 54 to connect the standard hook wiper arm 54 with the second adapter 1050. The second adapter 1050 also includes a pair of aligned lower transverse openings 1094 that cooperate with a vertically central distal end tab 1096 and a vertically lower distal end tab 1098 to connect the side lock wiper arm 62 with the second adapter 1050. A cavity 1074 is appropriately dimensioned to receive the push button 19 mm wiper arm 52, the push button 22 mm short wiper arm 58, the push button 22 mm wiper arm 60, the standard hook wiper arm 54, the large hook wiper arm 66, and the pinch tab wiper arm 56. The aligned upper transverse openings 1086 receive a portion of the side lock wiper arm 62, and the aligned lower transverse openings 1094 receive a portion of the side pin wiper arm 64.

FIG. 7 depicts an exploded view of the second adapter 1050. The second adapter 1050 in the illustrated embodiment includes an upper body 1110, a lower body 1112, and an inner body 1114 positioned between the upper body 1110 and the lower body 1112. The second adapter 1050 is shown as being manufactured from separate parts that are finally assembled and joined to each other to provide a one-piece body. The second adapter 1050 can be made from fewer separate components or a greater number of separate components than those shown in FIGS. 6-8.

In the illustrated embodiment, the upper body 1110 includes the upper proximal tab 1076, the upper distal tab 1078, the cutout 1082 and the aligned upper transverse openings 1086. When viewed from the proximal end 1070 (see FIG. 7), the upper body 1110 has a general upside down U-shaped configuration so as to include an inner side wall section 1120, an outer side wall section 1122, and a top wall section 1124 bridging between the inner side wall section 1120 and the outer side wall section 1122.

Figure 10:
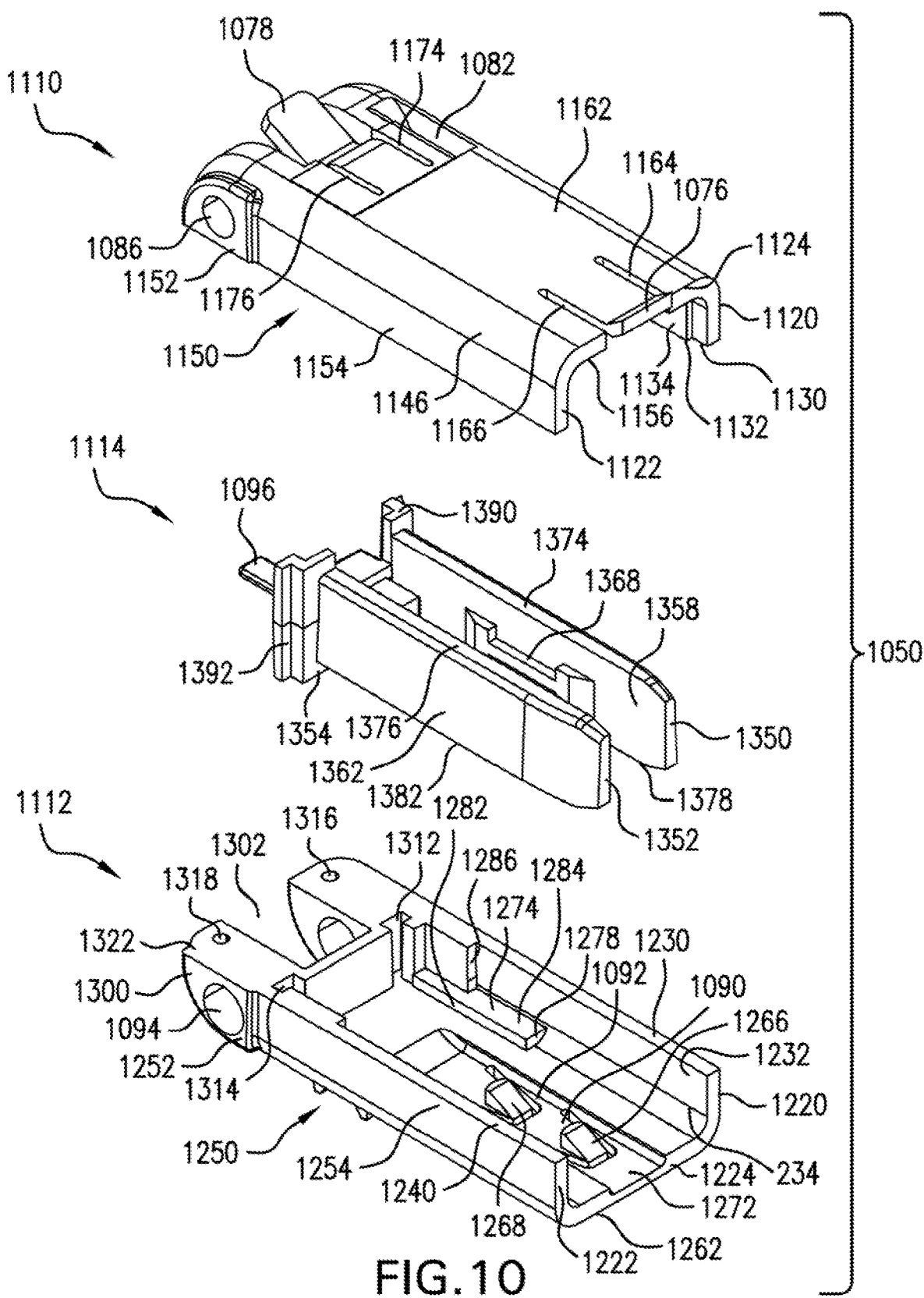
FIG. 10 is another exploded perspective view showing an opposite side of the adapter shown in FIG. 9.
Figure 11:
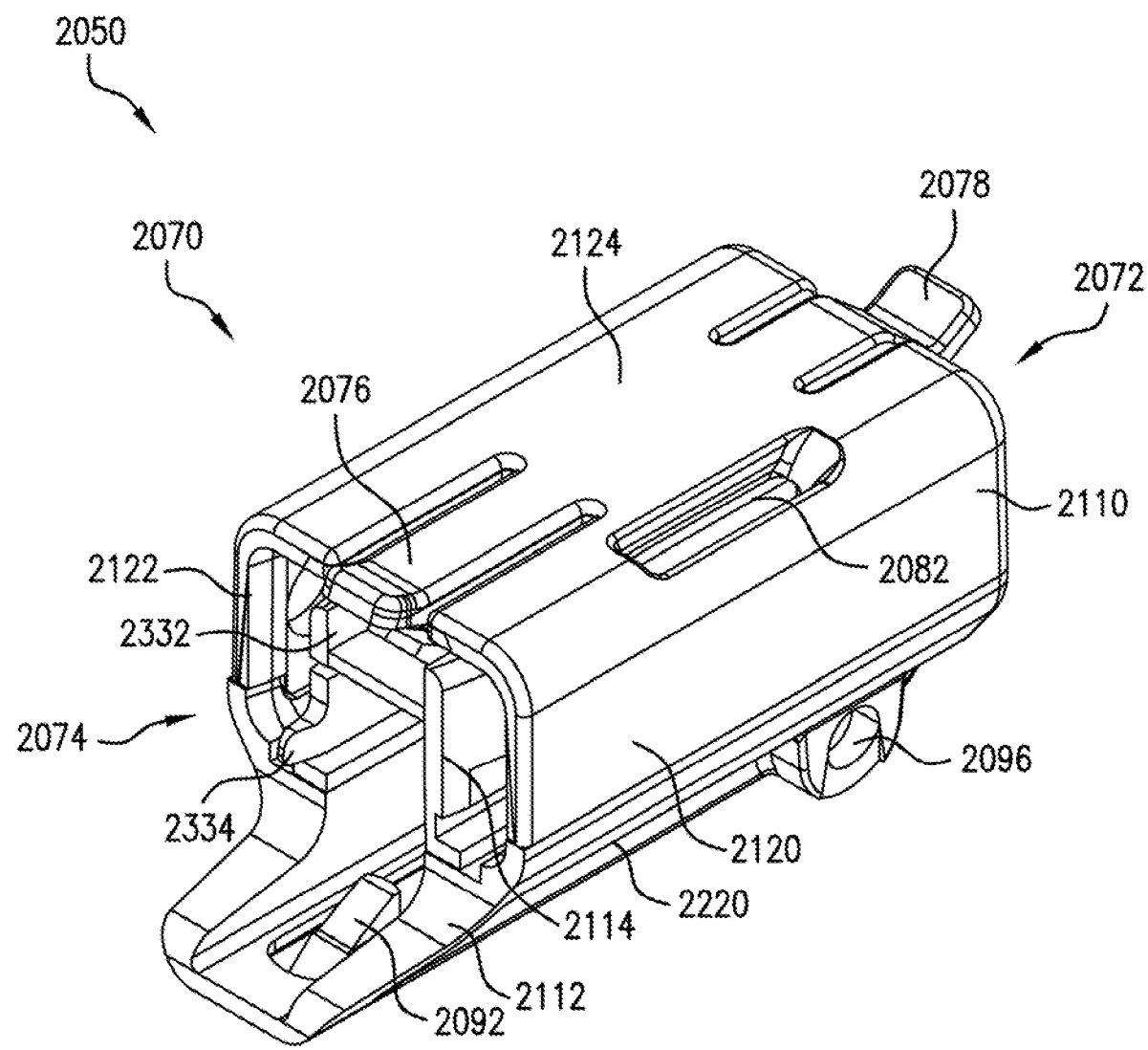
FIG. 11 is a perspective view of an adapter.

The upper body inner side wall section 1120 includes an inner lower edge 1130, which is more clearly seen in FIG. 10. An inner locating flange 1132 depends downwardly from the inner lower edge 1130 to facilitate connecting the upper body 1110 to the lower body 1112. The upper body inner side wall section 1120 also includes an interior surface 1134 and an exterior surface 1136. The exterior surface 1136 is substantially smooth and planar in the illustrated embodiment and faces toward the adapter-facing surface 38 when the second adapter 1050 is connected with the coupler 34.

The upper body outer side wall section 1122 also includes an outer lower edge 1140. An outer locating flange 1142 depends downwardly from the outer lower edge 1140. The upper body outer side wall section 1122 includes an interior surface 1144 and an exterior surface 1146. With reference to FIG. 10, an upper protuberance 1150 having an upper head section 1152 and an upper tail section 1154 extends outwardly from the exterior surface 1146 of the upper body outer side wall section 1122. The upper head section 1152 is curved and substantially semicircular in configuration. The upper tail section 1154 extends from the upper head section 1152 and tapers downwardly toward the proximal end 1070 (FIG. 7) of the second adapter 1050.

The upper body top wall section 1124 includes an interior surface 1156, in which a central upper recess 1158 is formed, and an exterior surface 1162. A first proximal end slot 1164 and a second proximal end slot 1166 each extend from the proximal end 1070 (FIG. 7) longitudinally toward the distal end 1072 (FIG. 8) to define the upper proximal tab 1076. A barb 168 extends downwardly from the upper proximal tab 1076 to engage in an opening provided in the push button 19 mm wiper arm 52, the push button 22 mm short wiper arm 58, or the push button 22 mm arm 60 (see FIG. 1).

The upper body 1110 also includes a distal end portion 1170 having a central notch 1172. The upper distal tab 1078 is positioned in the central notch 1172. As more clearly seen in FIG. 9, a first distal slot 1174 and a second distal slot 1176 define the upper distal tab 1078. A projection extends downwardly from the upper distal tab 1078 to engage inside an opening provided in the pinch tab wiper arm 56 (see FIG. 1). The cutout 1082 is located on a side of the central notch 1172 nearer to the upper body inner side wall section 1120 as compared to the outer side wall section 1122.

An inner vertical elongate slot and an outer vertical elongate slot are each provided in the distal end portion 1170. The vertical elongate slots facilitate attachment between the inner body 1114 with the upper body 1110. An inner post and an outer post each depend downwardly from a distal end portion lower surface, which is co-planar with the inner lower edge 1130 and the outer lower edge 1140, to facilitate attachment of the upper body 1110 to the lower body 1112.

In the illustrated embodiment, the lower body 1112 includes the first lower tab 1090, the second lower tab 1092, the aligned lower transverse openings 1094, and the vertically lower distal end tab 1098. When viewed from the proximal end 1070 (see FIG. 7), the lower body 1112 has a general U-shaped configuration and includes an inner side wall section 1220, an outer side wall section 1222, and a bottom wall section 1224 bridging between the inner side wall section 1220 and the outer side wall section 1222.

The lower body inner side wall section 1220 includes an inner upper edge 1230. The lower body inner side wall section 1220 also includes an interior surface 1234 and an exterior surface 1236. The exterior surface 1236 is substantially smooth and planar in the illustrated embodiment and faces toward the adapter-facing surface 38 when the second adapter 1050 is connected with the coupler 34.

The lower body outer side wall section 1222 also includes an outer upper edge 1240. The lower body outer side wall section 1222 also includes an interior surface 1244 and an exterior surface 1246. With reference to FIG. 10, a lower protuberance 1250 having a lower head section 1252 and a lower tail section 1254 extends outwardly from the exterior surface 1246 of the lower body outer side wall section 1222. The lower head section 1252 is curved and substantially semicircular in configuration. The lower tail section 1254 extends from the lower head section 1252 and tapers upwardly toward the proximal end 1070 (FIG. 8) of the second adapter 1050.

The bottom wall section 1224 includes an interior surface 1260 and an exterior surface 1262. A backwards "E"-shaped cutout 1264 extends through the bottom wall section 1224 to define the first lower tab 1090 and the second lower tab 1092. The first lower tab 1090 is positioned closer to the proximal end 1070 of the second adapter 1050 than the second lower tab 1092. With reference to FIG. 10, a first barb 1266 extends upwardly from the first lower tab 1090 to engage in an opening provided in the large hook wiper arm 66 (FIG. 1). A second barb 1268 extends upwardly from the second lower tab 1092 to engage in an opening provided in the standard hook wiper arm 54 (FIG. 1).

The bottom wall section 1224 also includes a central lower recess 1272 in which the first lower tab 1090 and the second lower tab 1092 are located. The central lower recess 1272 is centrally located between the lower body inner side wall section 1220 and the lower body outer side wall section 1222. The central lower recess 1272 extends from the proximal end 1070 (see FIG. 7) toward the distal end 1072. The standard hook wiper arm 54 and the large hook wiper arm 66 are received in the central upper recess 1158 and the central lower recess 1272 when a distal end of either arm is received in the cavity 1074 (FIG. 7) and respective barbs 1266, 1268 are received in respective openings near the distal end of the respective wiper arms 54, 66.

With respect to FIG. 10, an inner shelf 1274 and an outer shelf 1276 extend upwardly from the bottom wall section 1224. The inner shelf 1274 extends inwardly from the interior surface 1234 of the lower body inner side wall section 1220. The outer shelf 1276 extends inwardly from the interior surface 1244 of the lower body outer side wall section 1222. The inner shelf 1274 and the outer shelf 1276 are mirror images of one another with respect to a longitudinal central axis. Therefore, the inner shelf 1274 will be described with particularity with the understanding that the outer shelf 1276 takes a similar configuration.

The inner shelf 1274 defines a vertical transverse surface 1278 positioned adjacent to a section of the "E"-shaped cutout 1264 that defines the second lower tab 1092. The vertical transverse surface 1278 is planar in the illustrated embodiment. The inner shelf 1274 also defines a vertical longitudinal surface 1282 that is laterally offset from the central lower recess 1272 in a direction toward the lower body inner side wall section 1220. The vertical longitudinal surface 1282 is also planar. The inner shelf 1274 also defines a horizontal longitudinal surface 1284 that is vertically offset above the interior surface 1260 of the bottom wall section 1224. The horizontal longitudinal surface 1284 is also planar. A slightly inclined generally vertical surface 1286 extends upwardly from the horizontal longitudinal surface 1284.

The lower body 1112 includes a first catch and a second catch each extending downwardly from the exterior surface 1262 of the lower body bottom wall section 1224. The first and second catches cooperate with each other and are spaced appropriately to define an axle channel that receives the post (not visible in FIG. 1) extending between the adapter attachment mounts 42. The catches connecting with the post is only one possible method of attaching the second adapter 1050 to the coupler 34. Other types of attachment mechanisms that allow the second adapter 1050 to pivot with respect to the coupler 34 could also be used and these attachment mechanisms could be located on other surfaces of the second adapter 1050. For example, an attachment mechanism could be provided on an inner side or an outer side of the second adapter 1050.

The lower body 1112 also includes a lower body distal end portion 1300 having a lower central notch 1302 that is aligned with the upper central notch 1172 in the upper body distal end portion 1170 when the lower body 1112 is connected with the upper body 1110. The vertically lower distal end tab 1098 is positioned in the lower central notch 1302. A projection extends upwardly from the vertically lower distal end tab 1098 to engage inside an annular recess provided in an axle (or pin) on the side lock wiper arm 62 (FIG. 1) when the axle is received through one of the aligned lower transverse openings 1094.

An inner vertical elongate slot 1312 and an outer vertical elongate slot 1314 are each provided in the lower body distal end portion 1300. The vertical elongate slots 1312, 1314 facilitate attachment of the inner body 1114 with the lower body 1112. An inner post receptacle 1316 and an outer post receptacle 1318 are each provided in a lower body distal end portion upper surface 1322, which is co-planar with the inner upper edge 1230 and the outer upper edge 1240. The inner post receptacle 1316 receives the inner post and the outer post receptacle 1318 receives the outer post when the upper body 1110 is attached with the lower body 1112.

The inner body 1114 includes an inner tongue 1350 and an outer tongue 1352 that each extend toward the proximal end 1070 (FIG. 7) of the second adapter 1050 from a cross member 1354. The inner tongue 1350 includes an exterior surface 1356, which is generally planar, vertically oriented and offset from the interior surface 1134 of the upper body inner side wall section 1120 and the interior surface 1234 of the lower body inner side wall section 1220. The inner tongue 1350 also includes an interior surface 1358 that faces towards the outer tongue 1352.

Similarly, the outer tongue 1352 includes an exterior surface 362 parallel to the exterior surface 1356 of the inner tongue 1350. The outer tongue 1352 also includes an interior surface 1364 that is generally vertically oriented, parallel to and offset from the interior surface 1358 of the inner tongue 1350. An inner bone-shaped protuberance 1368 (FIG. 10) extends inwardly from the interior surface 1358 of the inner tongue 1350 towards the outer tongue 1352. Similarly, another inner protuberance 1372 (FIG. 9) is provided on the interior surface 1364 of the outer tongue 1352 and faces toward the inner tongue 1350. The inner protuberances 1368 and 1372 engage with the standard hook wiper arm 54 and the large hook wiper arm 66 when either the standard hook wiper arm 54 or the large hook wiper arm 66 is received within the cavity 1074 of the second adapter 1050 and more particularly between the inner tongue 1350 and the outer tongue 1352.

The inner tongue 1350 includes an inner tongue upper edge 1374 and the outer tongue 1352 includes an outer tongue upper edge 1376. The inner tongue upper edge 1374 is co-planar with the outer tongue upper edge 1376. The upper edges 1374 and 1376 are offset vertically beneath the interior surface 1156 of the upper body top wall section 1124. This allows horizontally (generally) disposed sections of the push button 19 mm wiper arm 52, the pinch tab wiper arm 56, the push button 22 mm short wiper arm 58, and the push button 22 mm wiper arm 60 to fit between the upper edges 1374, 1376 and the interior surface 1156 of the upper body top wall section 1124 when any of these aforementioned wiper arms 52, 56, 58 and 60 are received in the cavity 1074 (FIG. 7).

The inner tongue 1350 also includes an inner tongue lower edge 1378 and the outer tongue 1352 includes an outer tongue lower edge 1382. The lower edge 1378 of the inner tongue 1350 is co-planar with the lower edge 1382 of the outer tongue 1352. Each of the lower edges 1378, 1382 are offset from the interior surface 1260 of the lower body bottom wall section 1224.

An inner flange 1390 extends away from the cross member 1354. An outer flange 1392 also extends from the cross member 1354. When the second adapter 1050 is assembled, the inner flange 1390 is received in the inner vertical elongate slot in the upper body 1110 and in the inner vertical elongate slot 1312 in the lower body 1112. Likewise, the outer flange 1392 is received in the outer vertical elongate slot in the upper body 1110 and the outer vertical elongate slot 1314 in the lower body 1112.

The inner body 1114 also includes the vertically central distal end tab 1096 that extends away from the cross member 1354 in a direction opposite the direction in which the tongues 1350, 1352 extend. The vertically central distal end tab 1096 facilitates the connection of the side lock wiper arm 62 (FIG. 1) when the axle thereof is received through one of the aligned lower transverse openings 1094.

With reference to FIGS. 11-14, the third adapter 2050 is shown. The third adapter 2050 includes an upper proximal tab 2076 that cooperates with the push button 19 mm wiper arm 52, the push button 22 mm short wiper arm 58, the push button 22 mm wiper arm 60, and the fz wiper arm 69 to connect each of these wiper arms 52, 58, 60, 69 to the third adapter 2050. As noted hereinbefore, the various wiper arms are illustrated in FIG. 1. The third adapter 2050 also includes an upper distal tab 2078 that cooperates with the pinch tab wiper arm 56 for connecting the pinch tab wiper arm 56 with the third adapter 2050.

The third adapter 2050 also includes a cutout 2082 and a transverse distal opening 2086 (FIG. 12) that cooperates with the side pin wiper arm 64 or the side pin offset wiper arm 68 for connecting the side pin wiper arm 64 or the side pin offset wiper arm 68 to the third adapter 2050. As shown in FIG. 13, the third adapter 2050 further includes a first lower tab 2090 that cooperates with the large hook wiper arm 66 to connect the large hook wiper arm 66 with the third adapter 2050. The third adapter 2050 also includes a second lower tab 2092 that cooperates with the standard hook wiper arm 54 to connect the standard hook wiper arm 54 with the third adapter 2050.

Figure 12:
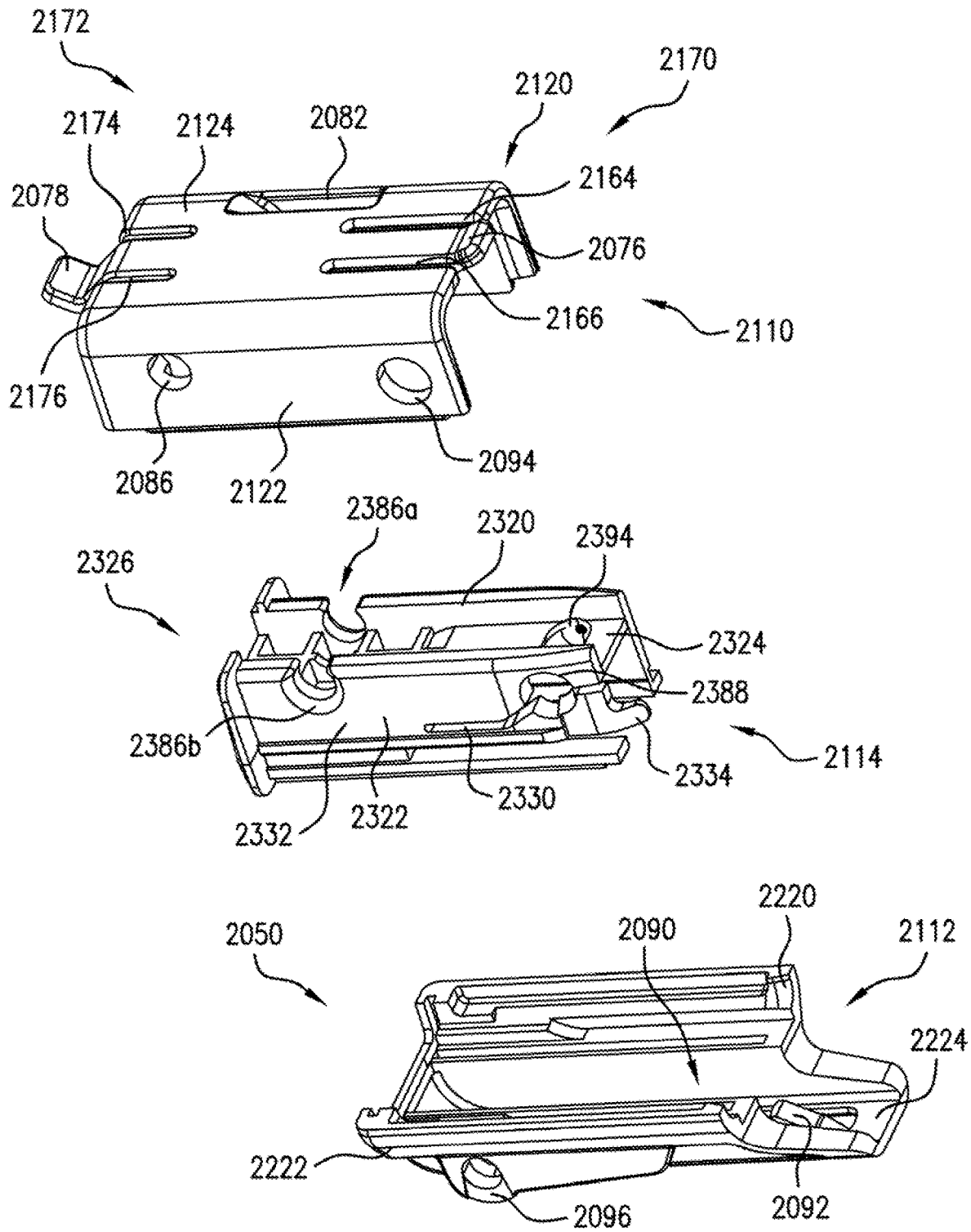
FIG. 12 is an exploded perspective view of the adapter of FIG. 11.
Figure 13:
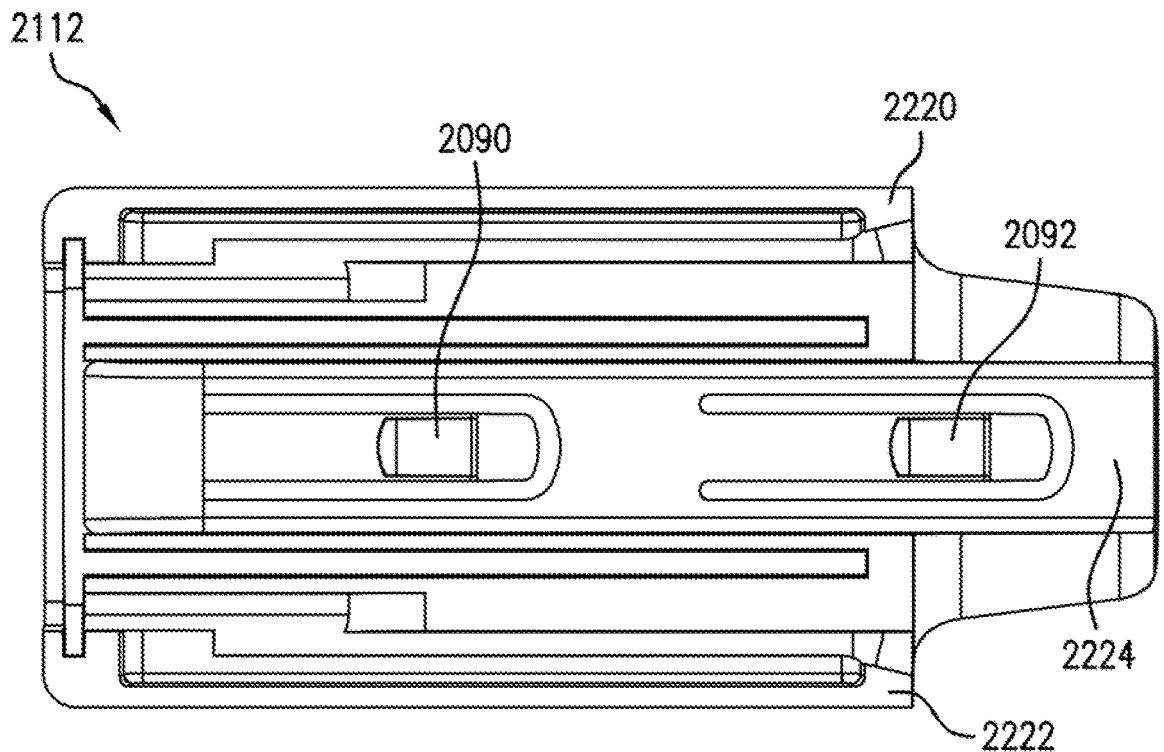
FIG. 13 is a top plan view of a lower body of the adapter of FIG. 11.
Figure 14:
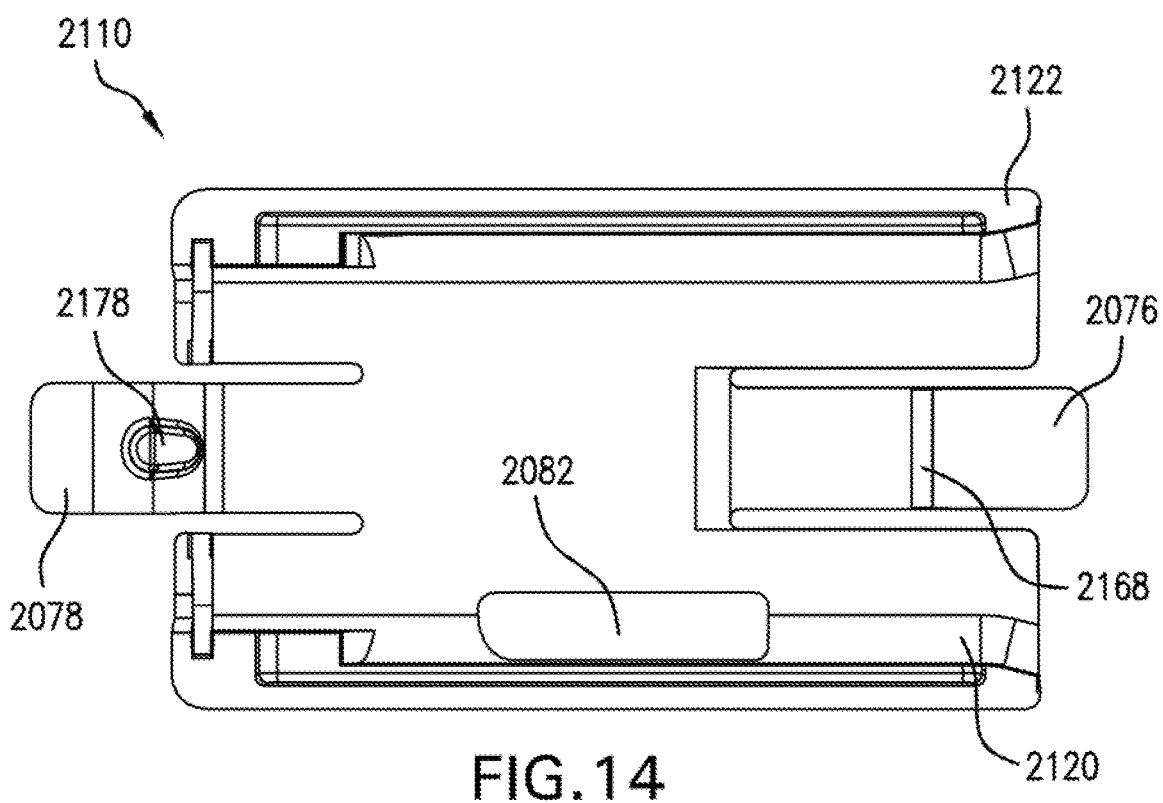
FIG. 14 is a bottom plan view of an upper body of the adapter of FIG. 11.

With reference to FIG. 12, the third adapter 2050 also includes a proximal transverse opening 2094 that receives the side lock wiper arm 62. The cavity 2074 is appropriately dimensioned to receive the push button 19 mm wiper arm 52, the standard hook wiper arm 54, the pinch tab wiper arm 56, the push button 22 mm short wiper arm 58, the push button 22 mm wiper arm 60, the large hook wiper arm 66, and the fz wiper arm 69.

With continued attention to FIG. 12, the third adapter 2050 in the illustrated embodiment includes an upper body 2110, a lower body 2112, and an inner body 2114 positioned between the upper body 2110 and the lower body 2112. The third adapter 2050 is shown as being manufactured from separate parts that are finally assembled and joined to each other to provide a one-piece body. The third adapter 2050 can be made from fewer separate components or a greater number of separate components than those shown.

The upper body 2110 includes the upper proximal tab 2076, the upper distal tab 2078, the cutout 2082, the transverse distal opening 2086, and the proximal transverse opening 2094. When viewed from the proximal end 2070, the upper body 2110 has a general upside down U-shaped configuration so as to include an inner side wall section 2120, an outer side wall section 2122, and a top wall section 2124 bridging between the inner side wall section 2120 and the outer side wall section 2122.

The upper body 2110 includes a proximal end portion 2170. The top wall section 2124 can define a first proximal end slot 2164 and a second proximal end slot 2166 that each extend from the proximal end 2070 longitudinally toward the distal end 2072 to define the upper proximal tab 2076. A barb 2168 (FIG. 14) extends downwardly from the upper proximal tab 2076 to engage in an opening provided in the push button 19 mm wiper arm 52, the push button 22 mm short wiper arm 58, the push button 22 mm arm 60, or the fz wiper arm 69.

The upper body 2110 also includes a distal end portion 2172 and can define a first distal slot 2174 and a second distal slot 2176 that cooperate to define a second upper distal tab 2078. A projection 2178 (FIG. 14) extends downwardly from the upper distal tab 2078 to engage inside an opening provided in the pinch tab wiper arm 56.

The inner body 2114 includes an inner wall section 2320, and an outer wall section 2322 that are spaced from one another. An intermediate wall section 2324 extends between the inner wall section 2320 and the outer wall section 2322 and a distal wall section 2326 connects the inner wall section 2320 and the outer wall section 2322 together at the distal end 272 of the third adapter 2050. The inner wall section 2320, the outer wall section 2322, and the intermediate wall section 2324 form an H shape when viewed from the proximal end 2070 of the third adapter 2050.

The inner wall section 2320 defines a distal opening 2386a and a depression 2394 and the outer wall section 2322 defines a distal opening 2386b and a proximal opening 2388. The distal opening 2386a of the inner wall section 2320 is in registry with the distal opening 2386b of the outer wall section 2322 and the transverse distal opening 2086 of the outer side wall section 2122.

The openings 2386a, 2386b, 2086 cooperate to receive pins of the side pin wiper arm 64 or the side pin offset wiper arm 68 to connect the side pin wiper arm 64 or the side pin offset wiper arm 68 to the third adapter 2050. Further, the depression 2394 of the inner wall section 2320, the proximal opening 2388 of the outer wall section 2322, and the proximal transverse opening 2094 of the upper body 2110 are in registry to receive a pin of the side lock wiper arm 62.

The outer wall section 2322 defines a bifurcating slot 2330 so as to create a fixed portion 2332 and a finger portion 2334. As will be appreciated, the slot 2330 allows for the finger portion 2334 to be moveable with respect to the fixed portion 2332 of the outer wall section 2322 or the inner wall section 2320. Thus, the finger portion 2334 can selectively flex away from the top wall section 2124 of the upper body 2110 to allow for a momentary increase in the diameter of the proximal opening 2388 to allow passage of a portion of the pin of the side lock wiper arm 62 that may have a slightly larger diameter than the proximal opening 2388. Then, when the finger portion 2334 returns to the non-flexed position, there is a secure fit with the pin of the side lock wiper arm 62.

Further, the finger portion 2334 can selectively flex away from the inner wall section 2320 to allow for a momentary increase in a distance between the finger portion 2334 and the inner wall section 2320 to allow passage of a portion of the various wiper arms. Then, when the finger portion 2334 returns to the non-flexed position, there is a secure fit with the wiper arm and the third adapter 2050.

The lower body 2112 includes the first lower tab 2090, the second lower tab 2092, and a mounting opening 2096. When viewed from the proximal end 2070, the lower body 2112 has a general U-shaped configuration and includes an inner side wall section 2220, an outer side wall section 2222, and a bottom wall section 2224 bridging between the inner side wall section 2220 and the outer side wall section 2222. For reference, the standard hook wiper arm 54 and the large hook wiper arm 66 are disposed between the bottom wall section 2224 and the intermediate wall section 2324 when the standard hook wiper arm 54 and the large hook wiper arm 66 are received by the third adapter 2050.

Figure 15:
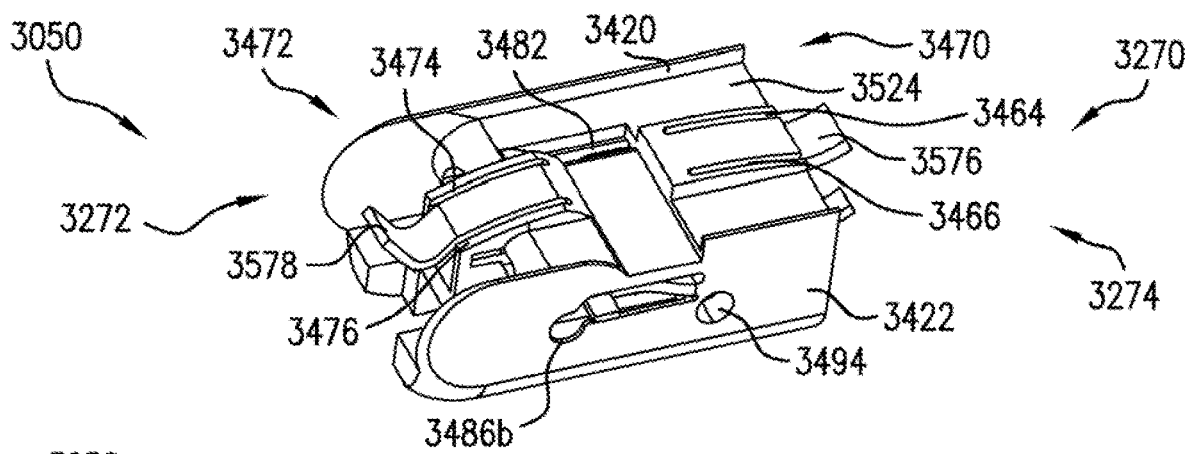
FIG. 15 is a front perspective view of an adapter.
Figure 16:
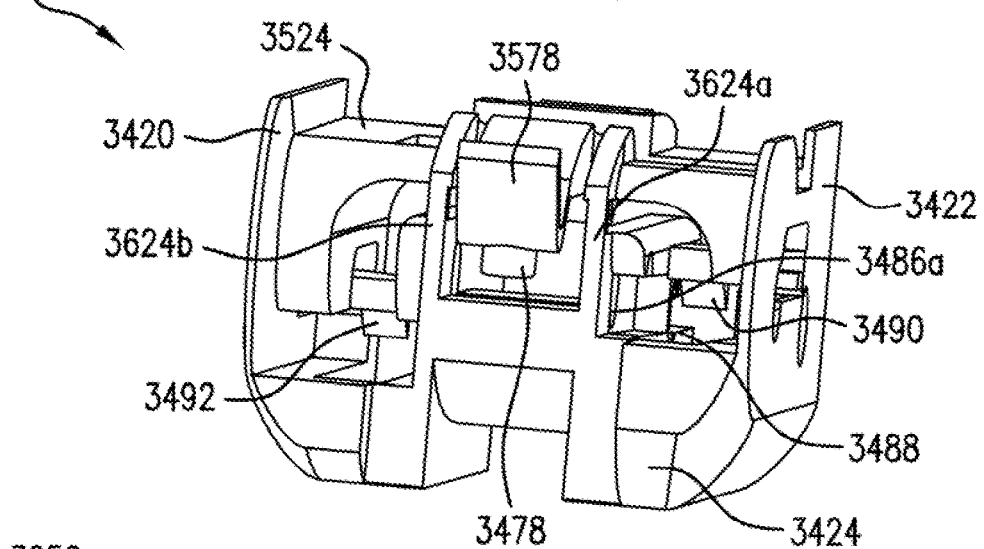
FIG. 16 is a bottom front perspective view of the adapter of FIG. 15.
Figure 17:
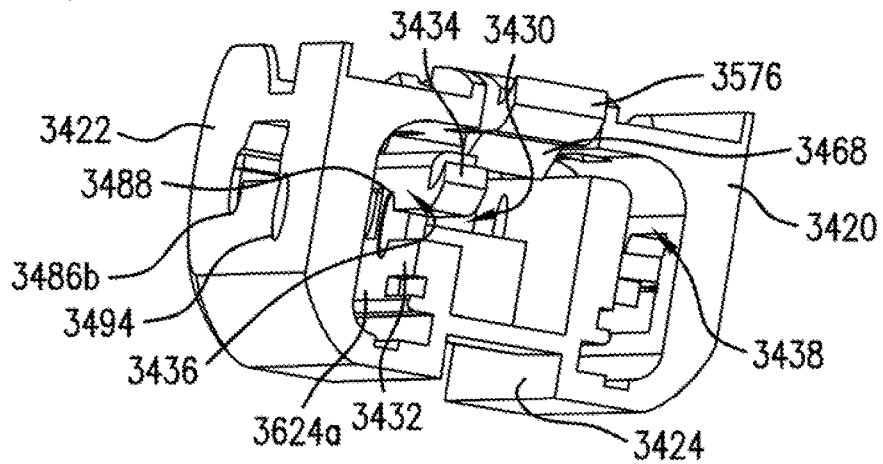
FIG. 17 is a bottom rear perspective view of the adapter of FIG. 15.

With reference to FIGS. 15-17, a fourth adapter 3050 is shown. The fourth adapter 3050 can be a one-piece body having a proximal end 3270 and a distal end 3272. The proximal end 3270 of the fourth adapter 3050 is open to a cavity 3274. The fourth adapter 3050 includes a plurality of attachment elements, which will be later described, to allow each of the aforementioned wiper arms to connect with the fourth adapter 3050.

The fourth adapter 3050 includes an upper proximal tab 3576 that cooperates with the push button 19 mm wiper arm 52, the push button 22 mm wiper arm 60, and the fz wiper arm 69 to connect each of these wiper arms 52, 60, 69 to the fourth adapter 3050. The fourth adapter 3050 also includes an upper distal tab 3578 that cooperates with the pinch tab wiper arm 56 for connecting the pinch tab wiper arm 56 with the fourth adapter 3050.

The fourth adapter 3050 also includes a cutout 3482 and a transverse distal opening 3486 that cooperate with the side pin wiper arm 64 for connecting the side pin wiper arm 64 to the fourth adapter 3050. Further, the fourth adapter 3050 also includes a proximal transverse opening 3494 that receives the side lock wiper arm 62.

With reference to FIG. 16, the fourth adapter 3050 also includes a first lower tab 3490 that cooperates with the large hook wiper arm 66 to connect the large hook wiper arm 66 with the fourth adapter 3050 and a second lower tab 3492 that cooperates with the standard hook wiper arm 54 to connect the standard hook wiper arm 54 with the fourth adapter 3050.

The fourth adapter 3050 includes an inner wall section 3420 and an outer wall section 3422 that are spaced from one another. A stepped bottom wall section 3424 connects the inner wall section 3420 and the outer wall section 3422 on a side of the fourth adapter 3050 and a top wall section 3524 connects the inner wall section 3420 and the outer wall section 3422 on an opposite side. A first intermediate wall section 3624a and a second intermediate wall section 3624b are disposed between the inner wall section 3420 and the outer wall section 3422.

The first intermediate wall section 3624a and the second intermediate wall section 3624b are spaced from one another and can be generally parallel to the inner wall section 3420 and the outer wall section 3422. A cavity 3274 is appropriately dimensioned to receive the push button 19 mm wiper arm 52, the standard hook wiper arm 54, the pinch tab wiper arm 56, the push button 22 mm wiper arm 60, the large hook wiper arm 66, and the fz wiper arm 69.

With continued reference to FIGS. 15-17, and more particularly FIG. 17, the top wall section 3524 is spaced from the bottom wall section 3424. Further, the first intermediate wall section 3624a is spaced from the outer wall section 3422 and the second intermediate wall section 3624*b* is spaced from the inner wall section 3420 so as to define a first hook opening 3436 and a second hook opening 3438 for receipt of at least part of the standard hook wiper arm 54 and the large hook wiper arm 66, respectively.

As shown in FIG. 15, the outer wall section 3422 defines a distal opening 3486*b* and a proximal transverse opening 3494. The first intermediate wall section 3624*a* defines a distal opening 3486*a* and a proximal transverse opening 3488. The distal opening 3486*a* of the first intermediate wall section 3624*a* is in registry with the distal opening 3486*b* of the outer wall section 3422. The openings 3486*a*, 3486*b* cooperate to receive pins of the side pin wiper arm 64 to connect the side pin wiper arm 64 to the fourth adapter 3050. Further, the proximal transverse opening 3488 of the first intermediate wall section 3624*a* and the proximal transverse opening 3494 of the outer wall section 3422 are in registry to receive a pin of the side lock wiper arm 62.

The top wall section 3524 can define a first proximal end slot 3464 (FIG. 17) and a second proximal end slot 3466 that each extend from a proximal end 3470 longitudinally toward a distal end 3472 to define the upper proximal tab 3576. A barb 3468 (FIG. 17) extends downwardly from the upper proximal tab 3576 to engage in an opening provided in the push button 19 mm wiper arm 52, the push button 22 mm arm 60, or the fz wiper arm 69.

The top wall section 3524 can define a first distal slot 3474 and a second distal slot 3476 that cooperate to define an upper distal tab 3578. A projection 3478 (FIG. 17) extends downwardly from the upper distal tab 3578 to engage inside an opening provided in the pinch tab wiper arm 56.

As shown in FIG. 17, the first intermediate wall section 3624*a* defines a bifurcating slot 3430 so as to create a fixed portion 3432 and a finger portion 3434. As will be appreciated, the slot 3430 allows for the finger portion 3434 to be moveable with respect to the fixed portion 3432 of the outer wall section 3422 or the inner wall section 3420.

Thus, the finger portion 3434 can selectively flex away from the bottom wall section 3424 to allow for a momentary increase in the diameter of the proximal transverse opening 3488 to allow passage of a portion of the pin of the side lock wiper arm 62 that may have a slightly larger diameter than the proximal transverse opening 3488. Then, when the finger portion 3434 returns to the non-flexed position, there is a secure fit with the pin of the side lock wiper arm 62.

Further, the finger portion 3434 can selectively flex toward and away from the inner wall section 3420 to accommodate passage of a portion of the various wiper arms. Then, when the finger portion 3434 returns to the non-flexed position, there is a secure fit with the wiper arm and the fourth adapter 3050.

Figure 18:
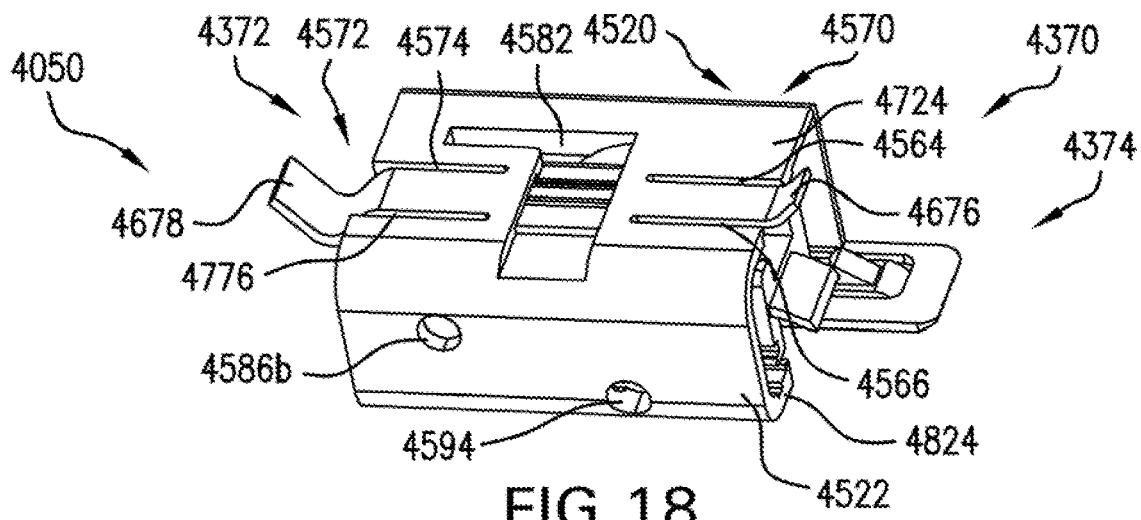
FIG. 18 is a front perspective view of an adapter.
Figure 19:
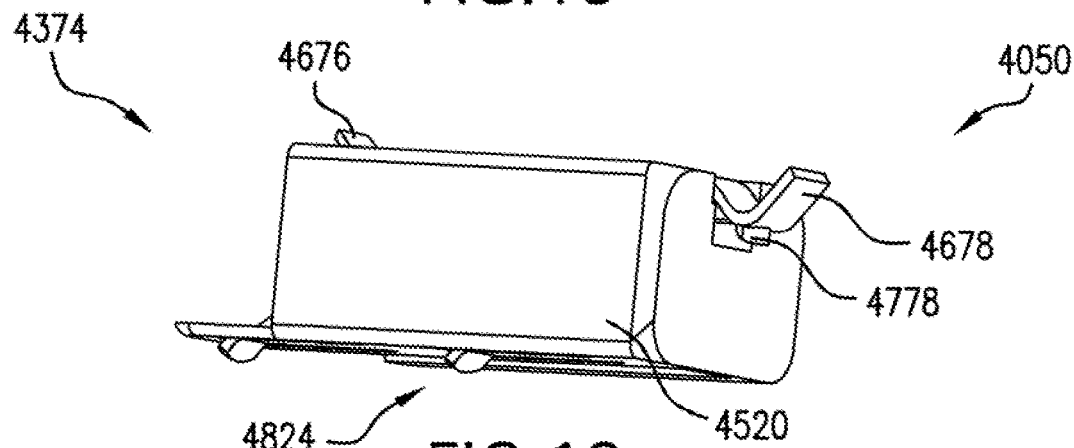
FIG. 19 is a bottom front perspective view of the adapter of FIG. 18.
Figure 20:
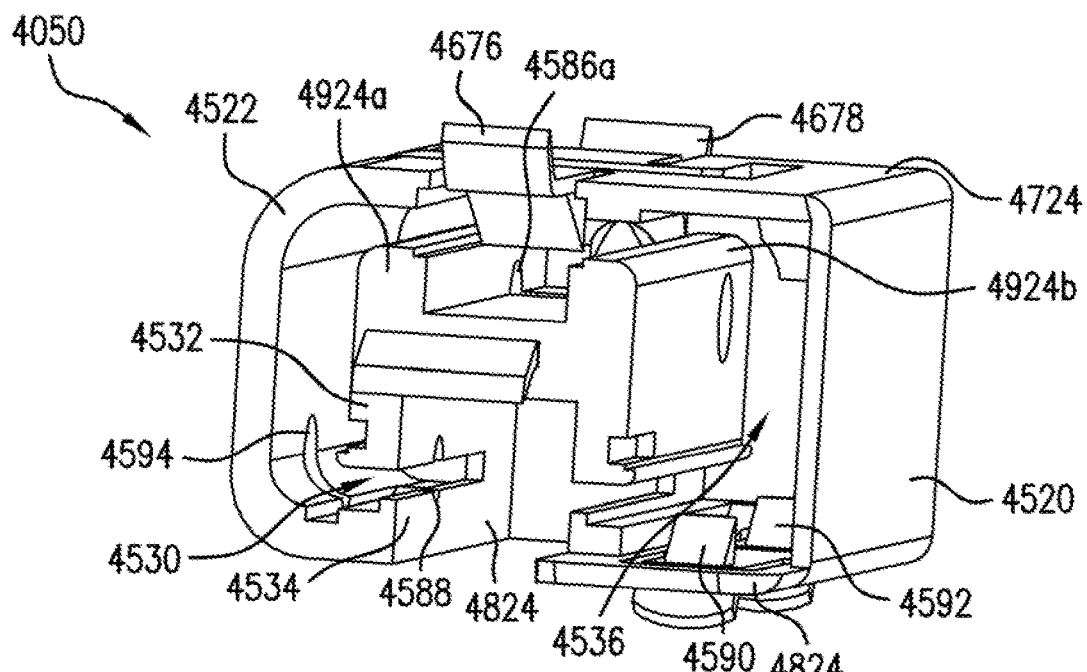
FIG. 20 is a bottom rear perspective view of the adapter of FIG. 18.

With reference to FIGS. 18-20, a fifth adapter 4050 is shown. The fifth adapter 4050 can be a one-piece body having a proximal end 4370 and a distal end 4372. The proximal end 4370 of the fifth adapter 4050 is open to a cavity 4374. The fifth adapter 4050 includes a plurality of attachment elements, which will be later described, to allow each of the aforementioned wiper arms to connect with the fifth adapter 4050.

The fifth adapter 4050 includes an upper proximal tab 4676 that cooperates with the push button 19 mm wiper arm 52, the push button 22 mm wiper arm 60, and the fz wiper arm 69 to connect each of these wiper arms 52, 60, 69 to the fifth adapter 4050. The fifth adapter 4050 also includes an upper distal tab 4678 that cooperates with the pinch tab wiper arm 56 for connecting the pinch tab wiper arm 56 with the fifth adapter 4050 and a proximal transverse opening 4594 that receives the side lock wiper arm 62.

The fifth adapter 4050 also includes a cutout 4582 and a transverse distal opening 4586*b* that cooperate with the side pin wiper arm 64 for connecting the side pin wiper arm 64 to the fifth adapter 4050. As shown in FIG. 20, the fifth adapter 4050 further includes a first lower tab 4590 that cooperates with the large hook wiper arm 66 to connect the large hook wiper arm 66 with the fifth adapter 4050. The fifth adapter 4050 also includes a second lower tab 4592 that cooperates with the standard hook wiper arm 54 to connect the standard hook wiper arm 54 with the fifth adapter 4050.

As illustrated, the fifth adapter 4050 includes an inner wall section 4520 and an outer wall section 4522 that are spaced from one another. A bifurcated bottom wall section 4824 contacts the inner wall section 4520 and the outer wall section 4522 on a side of the fifth adapter 4050 and a top wall section 4724 connects the inner wall section 4520 and the outer wall section 4522 on an opposite side.

A first intermediate wall section 4924*a* and a second intermediate wall section 4924*b* are disposed between the outer wall section 4522 and the inner wall section 4520. The first intermediate wall section 4924*a* and the second intermediate wall section 4924*b* are spaced from one another and can be generally parallel to the inner wall section 4520 and the outer wall section 4522. The cavity 4374 is appropriately dimensioned to receive the push button 19 mm wiper arm 52, the standard hook wiper arm 54, the pinch tab wiper arm 56, the push button 22 mm wiper arm 60, the large hook wiper arm 66, and the fz wiper arm 69.

The top wall section 4724 is spaced from the bottom wall section 4824 and the second intermediate wall section 4924*b* is spaced from the inner wall section 4520 so as to define a hook opening 536 for receipt of at least part either the standard hook wiper arm 54 or the large hook wiper arm 66.

The outer wall section 4522 defines the distal opening 4586*b* and the proximal transverse opening 4594. The first intermediate wall section 4924*a* defines a distal opening 4586*a* and a proximal transverse opening 4588. The distal opening 4586*a* of the first intermediate wall section 4924*a* is in registry with the distal opening 4586*b* of the outer wall section 4522. The openings 4586*a*, 4586*b* cooperate to receive pins of the side pin wiper arm 64 to connect the side pin wiper arm 64 to the fifth adapter 4050. Further, the proximal transverse opening 4588 of the first intermediate wall section 4924*a* and the proximal transverse opening 4594 of the outer wall section 4522 are in registry to receive a pin of the side lock wiper arm 62.

The top wall section 4724 can define a first proximal end slot 4564 and a second proximal end slot 4566 that each extend from a proximal end 4570 longitudinally toward a distal end 4572 to define the upper proximal tab 4676. A barb extends downwardly from the upper proximal tab 4676 to engage in an opening provided in the push button 19 mm wiper arm 52, the push button 22 mm arm 60, or the fz wiper arm 69.

The top wall section 4724 can define a first distal slot 4574 and a second distal slot 4776 that cooperate to define the upper distal tab 4678. A projection 4778 (FIG. 19) extends downwardly from the upper distal tab 4678 to engage inside an opening provided in the pinch tab wiper arm 56.

The first intermediate wall section 4924*a* can be at least partially continuous with a portion of the bottom wall section 4824. Further, the first intermediate wall section 4924*a* can define a bifurcating slot 4530 so as to create an upper portion 4532 and a lower portion 4534. As will be appreciated, the slot 4530 allows for selective flex of the first intermediate wall section 4924*a* to allow for a momentary increase in the diameter of the proximal transverse opening 4588 to allow passage of a portion of the pin of the side lock wiper arm 62 that may have a slightly larger diameter than the proximal transverse opening 4588. Then, when the first intermediate wall section 4924*a* returns to the non-flexed position, there is a secure fit with the pin of the side lock wiper arm 62.

A windshield wiper assembly and an adapter provided as part of the windshield wiper assembly to allow for the attachment of differently shaped wiper arms has been described above with particularity. Modifications and alterations will occur to those upon reading and understanding the preceding detailed description. The invention, however, is not limited to only the embodiments described above. Instead, the invention is broadly defined by the appended claim and the equivalents thereof.

The invention claimed is:

1. An adapter for connecting with a coupler that is connected with a wiper element, the adapter comprising a body having:
   means for receiving each of a plurality of wiper arms each having a different wiper arm style; and
   means for receiving distal end features of each of the plurality of different wiper arms;
   wherein:
   the body comprises an upper portion and a lower portion that cooperate to define the receiving means, and an inner body positioned between, and joined to, the upper portion and the lower portion;
   the inner body includes an inner tongue with an inner body interior surface and an inner body exterior surface that are opposite one another, an outer tongue with an outer tongue interior surface that faces toward the inner tongue and an outer tongue exterior surface that faces away from the inner tongue, and a cross member that connects the inner tongue and the outer tongue together, the inner tongue and the outer tongue extending from the cross member toward the proximal end; and
   a first inner protuberance inwardly extends from the interior surface of the inner tongue and a second inner protuberance inwardly extends from the interior surface of the outer tongue toward the first inner protuberance.

2. An adapter having a body that comprises:
   a single cavity that extends from a proximal end of the adapter toward a distal end of the adapter, the cavity being configured to receive each of a plurality of wiper arms through the proximal end of the adapter, wherein each of the plurality of wiper arms has a different wiper arm style; and
   a plurality of tabs configured to cooperate with one or more features of each of the plurality of wiper arms so as to selectively connect each one of the plurality of wiper arms to the adapter;
   wherein:
   the body comprises an upper portion and a lower portion that cooperate to define the cavity, and an inner body positioned between, and joined to, the upper portion and the lower portion;
   the inner body includes an inner tongue with an inner body interior surface and an inner body exterior surface that are opposite one another, an outer tongue with an outer tongue interior surface that faces toward the inner tongue and an outer tongue exterior surface that faces away from the inner tongue, and a cross member that connects the inner tongue and the outer tongue together, the inner tongue and the outer tongue extending from the cross member toward the proximal end; and
   a first inner protuberance inwardly extends from the interior surface of the inner tongue and a second inner protuberance inwardly extends from the interior surface of the outer tongue toward the first inner protuberance.

3. The adapter of claim 2, wherein the cavity is configured to selectively receive a standard hook wiper arm and a large hook wiper arm through the proximal end of the adapter, wherein the plurality of tabs comprise a first lower tab that is proximate to the proximal end of the adapter and a second lower tab that is between the first lower tab and the distal end of the adapter, wherein a first barb extends upwardly from the first lower tab and is configured to engage in an opening provided in the large hook wiper arm, and wherein a second barb extends upwardly from the second lower tab and is configured to engage in an opening provided in the standard hook wiper arm.

4. The adapter of claim 2, wherein the first inner protuberance and the second inner protuberance are configured to engage with a standard hook wiper arm and a large hook wiper arm that are selectively received in the cavity through the proximal end of the adapter.

5. The adapter of claim 2, wherein the upper portion includes an inner side wall section, an outer side wall section, and a top wall section bridging between the inner side wall section and the outer side wall section so as to define a general upside down U-shaped configuration, wherein the top wall section defines a cutout and the inner side wall section and the outer side wall section cooperate to define a pair of aligned upper transverse openings, and wherein the cutout and the pair of aligned upper transverse openings are configured to cooperate with a side pin wiper arm and a side pin offset wiper arm for selectively connecting the side pin wiper arm and the side pin offset wiper arm to the adapter.

6. The adapter of claim 5, wherein the inner tongue of the inner body defines an inner tongue proximal opening and the outer tongue of the inner body defines an outer tongue proximal opening, wherein the outer side wall section defines a proximal transverse opening that is in registry with the inner tongue proximal opening and the outer tongue proximal opening to receive a side lock 250 wiper arm.

7. The adapter of claim 6, wherein the adapter defines a lateral axis that extends between the inner tongue proximal opening and the outer tongue proximal opening, wherein the top wall section includes a transverse tab that is disposed along the lateral axis, and wherein the transverse tab is configured to engage the side lock 250 wiper arm to connect the side lock 250 wiper arm to the adapter.

8. The adapter of claim 2, wherein the plurality of tabs include an upper proximal tab and the upper body includes an inner side wall section, an outer side wall section, and a top wall section bridging between the inner side wall section and the outer side wall section so as to define a general upside down U-shaped configuration, wherein the top wall section defines a first proximal end slot and a second proximal end slot that each extend from the proximal end longitudinally toward the distal end to define the upper proximal tab, wherein a proximal barb extends downwardly from the upper proximal tab toward the lower portion to engage a push button 19 mm wiper arm, a push button 22 mm arm, a push button 22 mm short wiper arm, and an fz wiper arm to selectively connect the push button 19 mm wiper arm, the push button 22 mm arm, the push button 22 mm short wiper arm, and the fz wiper arm to the adapter.

9. The adapter of claim 8 further comprising a wedge elastically attached to the inner body, the wedge being laterally disposed between the inner body and the push button 22 mm arm and the push button 22 mm short wiper arm.

10. The adapter of claim 9, the wedge extending from the exterior surface of the inner tongue of the inner body from the proximal end of the adapter toward the distal end of the adapter so as to exert a lateral biasing force on the push button 22 mm arm and the push button 22 mm short wiper arm toward the inner side wall section of the upper body.

11. The adapter of claim 8 further comprising a wedge elastically attached to the inner body, the wedge being laterally disposed between the inner side wall of the upper body and the push button 19 mm wiper arm and the fz wiper arm.

12. The adapter of claim 11, the wedge extending from the exterior surface of the inner tongue of the inner body from the proximal end of the adapter toward the distal end of the adapter so as to exert a lateral biasing force on the push button 19 mm wiper arm and the fz wiper arm toward the exterior surface of the inner tongue of the inner body.

13. The adapter of claim 2, wherein the plurality of tabs include an upper distal tab and the upper body includes an inner side wall section, an outer side wall section, and a top wall section bridging between the inner side wall section and the outer side wall section so as to define a general upside down U-shaped configuration, wherein the top wall section defines a first distal slot and a second proximal slot that each extend from the distal end longitudinally toward the proximal end to define the upper distal tab, wherein a distal barb downwardly extends from the upper distal tab toward the lower portion to engage a pinch tab wiper arm to connect the pinch tab wiper arm to the adapter.

14. The adapter of claim 13 further comprising a wedge elastically attached to the inner body, the wedge being laterally disposed between the inner side wall of the upper body and the pinch tab wiper arm, wherein the wedge extends from the exterior surface of the inner tongue of the inner body from the proximal end of the adapter toward the distal end of the adapter so as to exert a lateral biasing force on the pinch tab wiper arm toward the exterior surface of the inner tongue of the inner body.

15. The adapter of claim 2, wherein the plurality of tabs include a lower distal tab that extends from the cross member of the inner body, wherein the upper body includes an inner side wall section, an outer side wall section, and a top wall section bridging between the inner side wall section and the outer side wall section so as to define a general upside down U-shaped configuration and a lower distal barb extends from the lower distal tab away from top wall section of the upper body, and wherein the lower portion defines a lower transverse opening that is configured to cooperate with the lower distal tab to connect a side lock 188 wiper arm with the adapter.

16. A wiper set comprising:
an adapter for connecting with a coupler that is connected with a wiper element, the adapter comprising a body having: (i) means for receiving each of a plurality of wiper arms each having a different wiper arm style, and (ii) means for receiving distal end features of each of the plurality of different wiper arms, the adapter including an adapter attachment mount having an entry passage defined by generally parallel entry passage sidewalls; and
a coupler that pivotally receives the adapter, the coupler including a post that defines a pivot axis about which the adapter pivots and a back wall including an adapter facing surface that faces the adapter, wherein:
the post defines an obround cross-section in a plane orthogonal to the pivot axis so as to include a pair of curved surfaces separated by a pair of flat surfaces;
the wiper set defines an installation mode when the post is received in the entry passage and the adapter is not pivotable, and an operation mode when the post is received in a pivot passage and the adapter is pivotable; and
a limit ledge extends from the adapter facing surface of the coupler toward the adapter for contact with a stop member of the adapter so as to divide the operation mode into a separable stage in which the adapter and the coupler are separable from one another, and a non-removable stage in which the adapter and the coupler are not separable from one another.

17. The wiper set of claim 16, wherein the entry passage is configured to slidingly receive the coupler and the pivot passage is configured to pivotally receive the coupler.

18. The wiper set of claim 16, wherein the coupler includes a depression for receipt of the adapter, the depression bounded by a floor, a proximal wall and a distal wall that are disposed at opposite longitudinal ends of the coupler, and a front wall and the back wall that are disposed at opposite lateral ends of the coupler.

19. The wiper set of claim 18, wherein the post of the coupler includes a first post portion and a second post portion that are disposed on the pivot axis and are laterally spaced from one another, wherein the coupler further includes a stop wing that upwardly extends from the floor, the stop wing being spaced from the front wall, the back wall, the proximal wall, and the distal wall, and wherein the stop wing is laterally disposed between, and spaced from, the first post portion and the second post portion.

20. The wiper set of claim 19, wherein the adapter attachment mount of the adapter includes an inner adapter attachment mount and an outer attachment mount disposed at opposite lateral ends of the adapter, the inner attachment mount and the outer attachment mount being configured to engage the second post portion and the first post portion, respectively, of the coupler, and wherein the adapter includes a stop member that downwardly extends from a bottom wall section of the adapter for engagement with the stop wing.

21. The wiper set of claim 20, wherein the stop member of the adapter is laterally disposed between the inner attachment mount and the outer attachment mount, and wherein the stop member interacts with the stop wing so as to provide an overcomable pivot stop for the adapter with respect to the coupler in a detent manner.

22. An adapter having a body that comprises:
a single cavity that extends from a proximal end of the adapter toward a distal end of the adapter, the cavity being configured to receive each of a plurality of wiper arms through the proximal end of the adapter, wherein each of the plurality of wiper arms has a different wiper arm style; and
a plurality of tabs configured to cooperate with one or more features of each of the plurality of wiper arms so as to selectively connect each one of the plurality of wiper arms to the adapter;

wherein:
the body comprises an upper portion and a lower portion that cooperate to define the cavity, wherein the body further comprises an inner body positioned between, and joined to, the upper portion and the lower portion;
the inner body includes an inner tongue with an inner body interior surface and an inner body exterior surface that are opposite one another, an outer tongue with an outer tongue interior surface that faces toward the inner tongue and an outer tongue exterior surface that faces away from the inner tongue, and a cross member that connects the inner tongue and the outer tongue together, the inner tongue and the outer tongue extending from the cross member toward the proximal end;
the upper portion includes an inner side wall section, an outer side wall section, and a top wall section bridging between the inner side wall section and the outer side wall section so as to define a general upside down U-shaped configuration;
the top wall section defines a cutout and the inner side wall section and the outer side wall section cooperate to define a pair of aligned upper transverse openings; and
the cutout and the pair of aligned upper transverse openings are configured to cooperate with a side pin wiper arm and a side pin offset wiper arm for selectively connecting the side pin wiper arm and the side pin offset wiper arm to the adapter.

23. An adapter having a body that comprises:
a single cavity that extends from a proximal end of the adapter toward a distal end of the adapter, the cavity being configured to receive each of a plurality of wiper arms through the proximal end of the adapter, wherein each of the plurality of wiper arms has a different wiper arm style; and
a plurality of tabs configured to cooperate with one or more features of each of the plurality of wiper arms so as to selectively connect each one of the plurality of wiper arms to the adapter;
wherein:
the body comprises an upper portion and a lower portion that cooperate to define the cavity;
the body further comprises an inner body positioned between, and joined to, the upper portion and the lower portion;
the inner body includes an inner tongue with an inner body interior surface and an inner body exterior surface that are opposite one another, an outer tongue with an outer tongue interior surface that faces toward the inner tongue and an outer tongue exterior surface that faces away from the inner tongue, and a cross member that connects the inner tongue and the outer tongue together, the inner tongue and the outer tongue extending from the cross member toward the proximal end;
the plurality of tabs include an upper proximal tab and the upper portion includes an inner side wall section, an outer side wall section, and a top wall section bridging between the inner side wall section and the outer side wall section so as to define a general upside down U-shaped configuration;
the top wall section defines a first proximal end slot and a second proximal end slot that each extend from the proximal end longitudinally toward the distal end to define the upper proximal tab; and
a proximal barb extends downwardly from the upper proximal tab toward the lower portion to engage a push button 19 mm wiper arm, a push button 22 mm arm, a push button 22 mm short wiper arm, and an fz wiper arm to selectively connect the push button 19 mm wiper arm, the push button 22 mm arm, the push button 22 mm short wiper arm, and the fz wiper arm to the adapter.

24. An adapter having a body that comprises:
a single cavity that extends from a proximal end of the adapter toward a distal end of the adapter, the cavity being configured to receive each of a plurality of wiper arms through the proximal end of the adapter, wherein each of the plurality of wiper arms has a different wiper arm style; and
a plurality of tabs configured to cooperate with one or more features of each of the plurality of wiper arms so as to selectively connect each one of the plurality of wiper arms to the adapter;
wherein:
the body comprises an upper portion and a lower portion that cooperate to define the cavity;
the body further comprises an inner body positioned between, and joined to, the upper portion and the lower portion;
the inner body includes an inner tongue with an inner body interior surface and an inner body exterior surface that are opposite one another, an outer tongue with an outer tongue interior surface that faces toward the inner tongue and an outer tongue exterior surface that faces away from the inner tongue, and a cross member that connects the inner tongue and the outer tongue together, the inner tongue and the outer tongue extending from the cross member toward the proximal end;
the plurality of tabs include an upper distal tab and the upper portion includes an inner side wall section, an outer side wall section, and a top wall section bridging between the inner side wall section and the outer side wall section so as to define a general upside down U-shaped configuration;
the top wall section defines a first distal slot and a second proximal slot that each extend from the distal end longitudinally toward the proximal end to define the upper distal tab; and
a distal barb downwardly extends from the upper distal tab toward the lower portion to engage a pinch tab wiper arm to connect the pinch tab wiper arm to the adapter.

25. An adapter having a body that comprises:
a single cavity that extends from a proximal end of the adapter toward a distal end of the adapter, the cavity being configured to receive each of a plurality of wiper arms through the proximal end of the adapter, wherein each of the plurality of wiper arms has a different wiper arm style; and
a plurality of tabs configured to cooperate with one or more features of each of the plurality of wiper arms so as to selectively connect each one of the plurality of wiper arms to the adapter;
wherein:
the body comprises an upper portion and a lower portion that cooperate to define the cavity;
the body further comprises an inner body positioned between, and joined to, the upper portion and the lower portion;

the inner body includes an inner tongue with an inner body interior surface and an inner body exterior surface that are opposite one another, an outer tongue with an outer tongue interior surface that faces toward the inner tongue and an outer tongue exterior surface that faces away from the inner tongue, and a cross member that connects the inner tongue and the outer tongue together, the inner tongue and the outer tongue extending from the cross member toward the proximal end;

the plurality of tabs include a lower distal tab that extends from the cross member of the inner body;

the upper portion includes an inner side wall section, an outer side wall section, and a top wall section bridging between the inner side wall section and the outer side wall section so as to define a general upside down U-shaped configuration and a lower distal barb extends from the lower distal tab away from top wall section of the upper portion; and the lower portion defines a lower transverse opening that is configured to cooperate with the lower distal tab to connect a side lock 188 wiper arm with the adapter.

26. A wiper set comprising:

an adapter for connecting with a coupler that is connected with a wiper element, the adapter comprising a body having: (i) means for receiving each of a plurality of wiper arms each having a different wiper arm style, and (ii) means for receiving distal end features of each of the plurality of different wiper arms, the adapter including an adapter attachment mount having an entry passage defined by generally parallel entry passage sidewalls; and a coupler that pivotally receives the adapter, the coupler including a post that defines a pivot axis about which the adapter pivots and a back wall including an adapter facing surface that faces the adapter;

wherein:

the coupler includes a depression for receipt of the adapter, the depression bounded by a floor, a proximal wall and a distal wall that are disposed at opposite longitudinal ends of the coupler, and a front wall and the back wall that are disposed at opposite lateral ends of the coupler;

the post of the coupler includes a first post portion and a second post portion that are disposed on the pivot axis and are laterally spaced from one another;

the coupler further includes a stop wing that upwardly extends from the floor, the stop wing being spaced from the front wall, the back wall, the proximal wall, and the distal wall; and the stop wing is laterally disposed between, and spaced from, the first post portion and the second post portion.

* * * * *